United States Patent
Jing et al.

(10) Patent No.: US 7,323,514 B2
(45) Date of Patent: *Jan. 29, 2008

(54) LOW REFRACTIVE INDEX FLUOROPOLYMER COATING COMPOSITIONS FOR USE IN ANTIREFLECTIVE POLYMER FILMS

(75) Inventors: Naiyong Jing, Woodbury, MN (US); Chuntao Cao, Woodbury, MN (US); Tatsuo Fukushi, Woodbury, MN (US); Timothy J. Tatge, Crystal, MN (US); William D. Coggio, Hudson, WI (US); Christopher B. Walker, Jr., St. Paul, MN (US); Thomas P. Klun, Lakeland, MN (US); William J. Schultz, North Oaks, MN (US); Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 423 days.

This patent is subject to a terminal disclaimer.

(21) Appl. No.: 11/026,640

(22) Filed: Dec. 30, 2004

(65) Prior Publication Data

US 2006/0147723 A1     Jul. 6, 2006

(51) Int. Cl.
*C08F 259/00* (2006.01)
(52) U.S. Cl. .................. 525/102; 525/254; 525/276
(58) Field of Classification Search ................ 525/102, 525/254, 276
See application file for complete search history.

(56) References Cited

U.S. PATENT DOCUMENTS

| | | | |
|---|---|---|---|
| 3,250,808 A | 5/1966 | Moore, Jr. et al. |
| 3,676,192 A | 7/1972 | Hahn |
| 3,833,368 A | 9/1974 | Land et al. |
| 3,894,118 A | 7/1975 | Aronoff et al. |
| 4,000,356 A | 12/1976 | Weisgerber et al. |
| 4,214,060 A | 7/1980 | Apotheker et al. |
| 4,262,072 A | 4/1981 | Wendling et al. |
| 4,654,233 A | 3/1987 | Grant et al. |
| 4,697,026 A | 9/1987 | Lee et al. |
| 4,803,147 A | 2/1989 | Mueller et al. |
| 4,855,184 A | 8/1989 | Klun et al. |
| 5,003,008 A | 3/1991 | Kobayashi |
| 5,148,511 A | 9/1992 | Savu et al. |
| 5,214,100 A | 5/1993 | Abele et al. |
| 5,476,717 A | 12/1995 | Floch |
| 5,733,981 A | 3/1998 | Coggio et al. |
| 5,846,650 A | 12/1998 | Ko et al. |
| 6,080,487 A | 6/2000 | Coggio et al. |
| 6,132,861 A | 10/2000 | Kang et al. |
| 6,224,949 B1 | 5/2001 | Wright et al. |
| 6,238,798 B1 | 5/2001 | Kang et al. |
| 6,245,833 B1 | 6/2001 | Kang et al. |
| 6,254,973 B1 | 7/2001 | Yoshida et al. |
| 6,270,901 B1 | 8/2001 | Parsonage et al. |
| 6,271,326 B1 | 8/2001 | Nishikawa et al. |
| 6,299,799 B1 | 10/2001 | Craig et al. |
| 6,343,865 B1 | 2/2002 | Suzuki |
| 6,346,300 B1 | 2/2002 | Ruepping |
| 6,346,328 B1 | 2/2002 | Parsonage et al. |
| 6,379,788 B2 | 4/2002 | Choi et al. |
| 6,429,249 B1 | 8/2002 | Chen et al. |
| 6,464,822 B1 | 10/2002 | Choi et al. |
| 6,497,961 B2 | 12/2002 | Kang et al. |
| 6,572,693 B1 | 6/2003 | Wu et al. |
| 6,630,407 B2 | 10/2003 | Keil et al. |
| 6,680,357 B1 | 1/2004 | Hedhli et al. |
| 6,685,793 B2 | 2/2004 | Jing |
| 6,734,227 B2 | 5/2004 | Jing et al. |
| 6,753,087 B2 | 6/2004 | Jing et al. |
| 6,794,469 B2 | 9/2004 | Obayashi et al. |
| 2001/0033934 A1 | 10/2001 | Port et al. |
| 2001/0050741 A1 | 12/2001 | Hokazono et al. |
| 2002/0001710 A1 | 1/2002 | Kang et al. |
| 2002/0197481 A1 | 12/2002 | Jing et al. |
| 2003/0049343 A1 | 3/2003 | Foreman et al. |
| 2003/0077454 A1 | 4/2003 | Jing |
| 2003/0120008 A1 | 6/2003 | Obayashi et al. |
| 2004/0019176 A1 | 1/2004 | Araki et al. |
| 2004/0114248 A1 | 6/2004 | Hokazono et al. |
| 2004/0124396 A1 | 7/2004 | Flynn et al. |

(Continued)

FOREIGN PATENT DOCUMENTS

| | | |
|---|---|---|
| EP | 0161581 | 11/1985 |
| EP | 0243605 | 11/1987 |
| EP | 0 398 241 A2 | 5/1989 |
| EP | 0 407 937 A1 | 7/1990 |
| EP | 0428133 | 5/1991 |
| EP | 0457903 | 11/1991 |
| EP | 0488627 | 6/1992 |
| EP | 0339880 | 8/1993 |
| EP | 0570254 | 11/1993 |

(Continued)

OTHER PUBLICATIONS

Banks, R.E. et al., Fluoropolymers; Organofluorine Chemistry; 1994; pp. 380-396, Plenum Press; New York and London.

(Continued)

*Primary Examiner*—Bernard Lipman
(74) *Attorney, Agent, or Firm*—Carolyn A. Fischer

(57) ABSTRACT

An economic, optically transmissive, stain and ink repellent, durable low refractive index fluoropolymer composition for use in an antireflection film or coupled to an optical display. In one aspect of the invention, the composition is formed from the reaction product of a fluoropolymer or reactive fluoropolymer, an amino silane ester coupling agent or ester equivalent, a multi-olefinic crosslinker, and optional surface modified inorganic particles or sol gel precursors.

28 Claims, 1 Drawing Sheet

U.S. PATENT DOCUMENTS

| | | |
|---|---|---|
| 2004/0196558 A1 | 10/2004 | Takahashi et al. |
| 2005/0038137 A1 | 2/2005 | Yoshihara et al. |
| 2005/0038187 A1 | 2/2005 | Mano et al. |
| 2005/0136252 A1 | 6/2005 | Chisholm et al. |
| 2005/0182199 A1 | 8/2005 | Jing et al. |
| 2005/0249942 A1 | 11/2005 | Coggio et al. |
| 2005/0250921 A1 | 11/2005 | Qiu et al. |
| 2006/0148996 A1 | 7/2006 | Coggio et al. |

FOREIGN PATENT DOCUMENTS

| | | |
|---|---|---|
| EP | 0863128 | 9/1998 |
| EP | 0953584 | 11/1999 |
| EP | 1026200 | 8/2000 |
| EP | 1279443 | 1/2003 |
| EP | 1460091 | 9/2004 |
| JP | 2003-183322 | 7/2003 |
| JP | 2003-183592 | 7/2003 |
| WO | WO 93/21010 | 10/1993 |
| WO | WO 94/06837 | 3/1994 |
| WO | WO 00/12574 | 3/2000 |
| WO | WO 02/18457 | 3/2002 |
| WO | WO 03/054031 | 7/2003 |
| WO | WO 2005/103175 | 11/2005 |

OTHER PUBLICATIONS

Modern Fluoropolymers, J. Scheirs Ed, (1997), J Wiley Science, Chapters 2, 13, and 32. (ISBN 0-471-97055-7).

Dec. 2003 Disclosure to Japan.

S.C. Kim, L.H. Sperling; IPNS Around the World Science and Engineering, The Current Status of Interpenetrating Polymer Networks 1997, J. Wiley & Sons Ltd., pp. 1-5.

Schmiegel, W., Crosslinking of Elastomeric Vinylidene Fluoride Copolymers with Nucleophiles; Angewandre Chemie 1979 vol. 76/77 39-65.

U.S. Appl. No. 60/569,351, filed May 7, 2004.

LOW REFRACTIVE INDEX FLUOROPOLYMER COATING COMPOSITIONS FOR USE IN ANTIREFLECTIVE POLYMER FILMS

TECHNICAL FIELD AND INDUSTRIAL APPLICABILITY OF THE INVENTION

The present invention relates to antireflective films and more specifically to low refractive index fluoropolymer coating compositions for use in antireflection polymer films.

BACKGROUND OF THE INVENTION

Antireflective polymer films ("AR films") are becoming increasingly important in the display industry. New applications are being developed for low reflective films applied to substrates of articles used in the computer, television, appliance, mobile phone, aerospace and automotive industries.

AR films are typically constructed by alternating high and low refractive index ("RI") polymer layers in order to minimize the amount of light that is reflected from the optical display surface. Desirable product features in AR films for use on optical goods are a low percentage of reflected light (e.g. 1.5% or lower) and durability to scratches and abrasions. These features are obtained in AR constructions by maximizing the delta RI between the polymer layers while maintaining strong adhesion between the polymer layers.

It is known that the low refractive index polymer layers used in AR films can be derived from fluorine containing polymers ("fluoropolymers" or "fluorinated polymers"). Fluoropolymers provide advantages over conventional hydrocarbon-based materials relative to high chemical inertness (in terms of acid and base resistance), dirt and stain resistance (due to low surface energy) low moisture absorption, and resistance to weather and solar conditions.

The refractive index of fluorinated polymer coating layers can be dependent upon the volume percentage of fluorine contained within the layer. Increased fluorine content in the layers typically decreases the refractive index of the coating layer. However, increasing the fluorine content of fluoropolymer coating layers can decrease the surface energy of the coating layers, which in turn can reduce the interfacial adhesion of the fluoropolymer layer to other polymer or substrate layers to which the layer is coupled.

Thus, it is highly desirable to form a low refractive index layer for an antireflection film having increased fluorine content, and hence lower refractive index, while improving interfacial adhesion to accompanying layers or substrates.

SUMMARY OF THE INVENTION

The present invention provides an economic and durable low refractive index fluoropolymer composition for use as a low refractive index film layer in an antireflective film for an optical display. The low refractive index composition forms layers having strong interfacial adhesion to a high index refractive layer and/or a substrate material.

In one aspect of the invention, a low refractive polymer index layer is formed from the reaction product of a reactive fluoropolymer, an amino-substituted organosilane ester or ester equivalent, and a multi-olefinic crosslinker by either a thermal- or a photo-chemical process.

The term "reactive fluoropolymer", or "functional fluoropolymer" will be understood to include fluoropolymers, copolymers (e.g. polymers using two or more different monomers), oligomers and combinations thereof, which contain a reactive functionality such as a halogen-containing cure site monomer or halogen-containing endgroup and/or a sufficient level of unsaturation. This functionality allows for further reactivity between the other components of the coating mixture to facilitate network formation during cure and improve further the durability of the cured coating.

Further, the mechanical strength and scratch resistance of any of above low refractive index compositions can be enhanced by the addition of surface functionalized nanoparticles or by a sol gel precursor into the fluoropolymer compositions.

The present invention also provides an article having an optical display that is formed by introducing the antireflection film having a layer of the above low refractive index compositions to an optical substrate. The resultant optical device has an outer coating layer that is easy to clean, durable, and has low surface energy.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
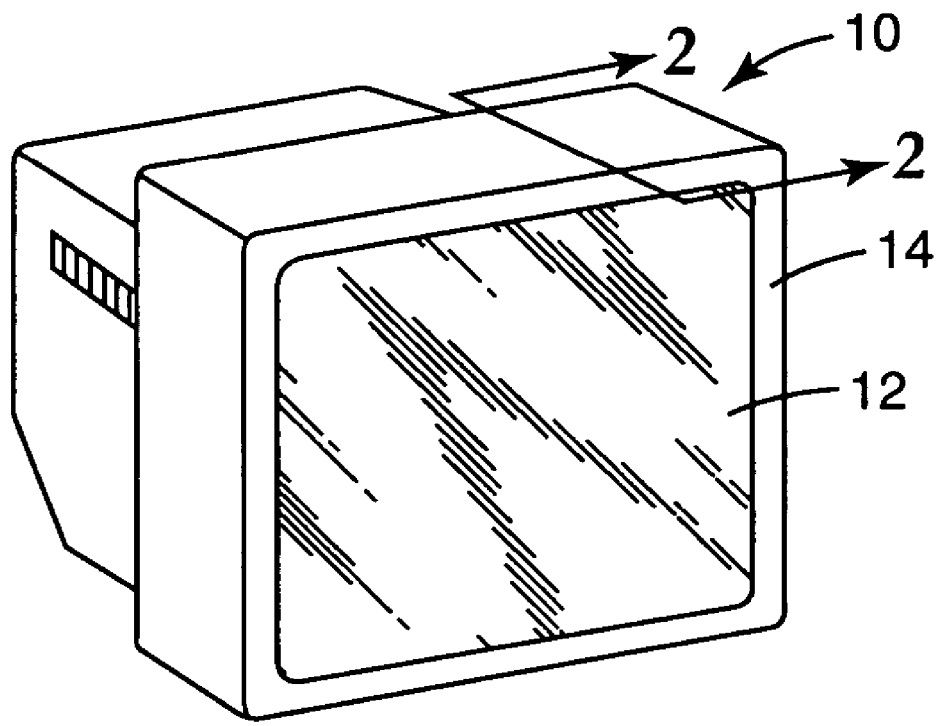
FIG. 1 is perspective view of an article having an optical display.

For the following defined terms, these definitions shall be applied, unless a different definition is given in the claims or elsewhere in the specification.

The term "polymer" will be understood to include polymers, copolymers (e.g. polymers using two or more different monomers), oligomers and combinations thereof, as well as polymers, oligomers, or copolymers that can be formed in a miscible blend.

As used herein, the term "ceramer" is a composition having inorganic oxide particles, e.g. silica, of nanometer dimensions dispersed in a binder matrix. The phrase "ceramer composition" is meant to indicate a ceramer formulation in accordance with the present invention that has not been at least partially cured with radiation energy, and thus is a flowing, coatable liquid. The phrase "ceramer composite" or "coating layer" is meant to indicate a ceramer formulation in accordance with the present invention that has been at least partially cured with radiation energy, so that it is a substantially non-flowing solid. Additionally, the phrase "free-radically polymerizable" refers to the ability of monomers, oligomers, polymers or the like to participate in crosslinking reactions upon exposure to a suitable source of curing energy.

The term "low refractive index", for the purposes of the present invention, shall mean a material when applied as a layer to a substrate forms a coating layer having a refractive index of less than about 1.5, and more preferably less than about 1.45, and most preferably less than about 1.42.

The term "high refractive index", for the purposes of the present invention, shall mean a material when applied as a layer to a substrate forms a coating layer having a refractive index of greater than about 1.5.

The recitation of numerical ranges by endpoints includes all numbers subsumed within the range (e.g. the range 1 to 10 includes 1, 1.5, 3.33, and 10).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly indicates otherwise.

Unless otherwise indicated, all numbers expressing quantities of ingredients, measurements of properties such as contact angle and so forth as used in the specification and claims are to be understood to be modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as accurately as possible. Any numerical value, however, inherently contains certain errors necessarily resulting from the standard deviations found in their respective testing measurements.

The present invention is directed to antireflection materials used as a portion of optical displays ("displays"). The displays include various illuminated and non-illuminated displays panels wherein a combination of low surface energy (e.g. anti-soiling, stain resistant, oil and/or water repellency) and durability (e.g. abrasion resistance) is desired while maintaining optical clarity. The antireflection material functions to decrease glare and decrease transmission loss while improving durability and optical clarity.

Such displays include multi-character and especially multi-line multi-character displays such as liquid crystal displays ("LCDs"), plasma displays, front and rear projection displays, cathode ray tubes ("CRTs")+signage, as well as single-character or binary displays such as light emitting tubes ("LEDs"), signal lamps and switches. The light transmissive (i.e. exposed surface) substrate of such display panels may be referred to as a "lens." The invention is particularly useful for displays having a viewing surface that is susceptible to damage.

The coating composition, and reactive product thereof, as well as the protective articles of the invention, can be employed in a variety of portable and non-portable information display articles. These articles include, but are not limited by, PDAs, LCD TV's (direct lit and edge lit), cell phones (including combination PDA/cell phones), touch sensitive screens, wrist watches, car navigation systems, global positioning systems, depth finders, calculators, electronic books, CD and DVD players, projection televisions screens, computer monitors, notebook computer displays, instrument gauges, instrument panel covers, signage such as graphic displays and the like. These devices can have planar viewing faces, or non-planar viewing faces such as slightly curved faces. The above listing of potential applications should not be construed to unduly limit the invention.

Referring now to FIG. 1, a perspective view of an article, here a computer monitor 10, is illustrated according to one preferred embodiment as having an optical display 12 coupled within a housing 14. The optical display 12 is a substantially transparent material having optically enhancing properties through which a user can view text, graphics or other displayed information.

Figure 2:
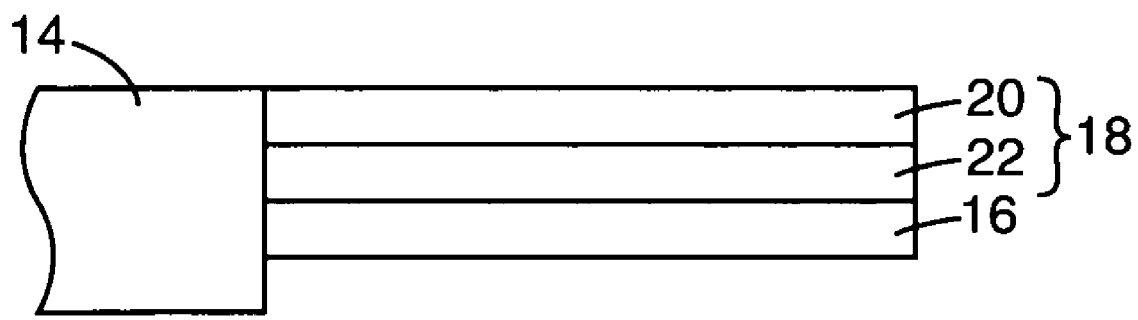
FIG. 2 is a sectional view of the article of FIG. 1 taken along line 2-2 illustrating an antireflection film having a low refractive index layer formed in accordance with a preferred embodiment of the present invention.

As best shown in FIG. 2, the optical display 12 includes an antireflection film 18 coupled (coated) to an optical substrate 16. The antireflection film 18 has at least one layer of a high refraction index layer 22 and a low refractive index layer 20 coupled together such that the low refractive index layer 20 being positioned to be exposed to the atmosphere while the high refractive index layer 22 is positioned between the substrate 16 and low refractive index layer 20.

The optical substrate 16 preferably comprises an inorganic material, such as glass, or a polymeric organic material such as polyethylene terephthalate ("PET"), that are well known to those of ordinary skill in the optical display art. In addition, the substrate 16 may comprise a hybrid material, having both organic and inorganic components.

While not shown, other layers may be incorporated into the optical device, including, but not limited to, other hard coating layers, adhesive layers, and the like. Further, the antireflection material 18 may be applied directly to the substrate 16, or alternatively applied to a release layer of a transferable antireflection film and subsequently transferred from the release layer to the substrate using a heat press or photoradiation application technique.

The high refractive index layer 22 is a conventional carbon-based polymeric composition having a mono and multi-acrylate crosslinking system.

The low refractive index coating composition of the present invention used to form layer 20, in one preferred approach, is formed by first forming an amino-silane modified fluoropolymer from a reactive fluoropolymer and an amino-substituted organosilane ester or ester equivalent and then reactively photo-crosslinking the amino-silane modified fluoropolymer with a multi-olefinic crosslinker. The reaction mechanism for forming the coating composition is described further below as Reaction Mechanism 1.

In another preferred approach, inorganic surface functionalized nanoparticles are added to the low refractive index composition 20 described in the preceding paragraph to provide increased mechanical strength and scratch resistance to the low index coatings.

In another preferred approach, a sol gel precursor of tetraethoxysilane ("TEOS') or vinyltriethoxysilane ("Vinyl TEOS"), or other tetraalkoxysilanes or trialkoxysilanes, is introduced to the low refractive composition 20 described above. Upon curing, this forms an inorganic silica phase within the low index coating that provides increased mechanical strength and scratch resistance.

The low refractive index composition that is formed in either preferred approach is then applied directly or indirectly to a substrate 16 of a display 12 to form a low refractive index portion 20 of an antireflection coating 18 on the article 10. With this invention, the article 10 has outstanding optical properties, including decreased glare and increased optical transmissivity. Further, the antireflection coating 18 has outstanding durability and can provide ink and stain repellency properties.

The ingredients for forming the various low refractive index compositions are summarized in the following paragraphs, followed by the reaction mechanism for forming the low refractive index coating without surface functionalized nanoparticles.

Fluoropolymer

Fluoropolymer materials used in the low index coating may be described by broadly categorizing them into one of two basic classes. A first class includes those amorphous fluoropolymers comprising interpolymerized units derived from vinylidene fluoride (VDF) and hexafluoropropylene (HFP) and optionally tetrafluoroethylene (TFE) monomers. Examples of such are commercially available from 3M Company as Dyneon™ Fluoroelastomer FC 2145 and FT 2430. Additional amorphous fluoropolymers contemplated by this invention are for example VDF-chlorotrifluoroethylene copolymers, commercially known as Kel-F™ 3700, available from 3M Company. As used herein, amorphous fluoropolymers are materials that contain essentially no crystallinity or possess no significant melting point as determined for example by differential scanning caloriometry (DSC). For the purpose of this discussion, a copolymer is defined as a polymeric material resulting from the simultaneous polymerization of two or more dissimilar monomers and a homopolymer is a polymeric material resulting from the polymerization of a single monomer.

The second significant class of fluoropolymers useful in this invention are those homo and copolymers based on fluorinated monomers such as TFE or VDF which do contain a crystalline melting point such as polyvinylidene fluoride (PVDF, available commercially from 3M Company as Dyneon™ PVDF, or more preferable thermoplastic copolymers of TFE such as those based on the crystalline microstructure of TFE-HFP-VDF. Examples of such polymers are those available from 3M under the trade name Dyneon™ Fluoroplastic THV™ 200.

A general description and preparation of these classes of fluoropolymers can be found in Encyclopedia Chemical Technology, *Fluorocarbon Elastomers*, Kirk-Othmer (1993), or in *Modern Fluoropolymers*, J. Scheirs Ed, (1997), J Wiley Science, Chapters 2, 13, and 32. (ISBN 0471-97055-7).

The preferred fluoropolymers are copolymers formed from the constituent monomers known as tetrafluoroethylene ("TFE"), hexafluoropropylene ("HFP"), and vinylidene fluoride ("VDF," "VF2,"). The monomer structures for these constituents are shown below:

TFE: $CF_2=CF_2$     (1)

VDF: $CH_2=CF_2$     (2)

HFP: $CF_2=CF—CF_3$     (3)

The preferred fluoropolymer consists of at least two of the constituent monomers (HFP and VDF), and more preferably all three of the constituents monomers in varying molar amounts. Additional monomers not depicted in (1), (2) or (3) but also useful in the present invention include perfluorovinyl ether monomers of the general structure $CF_2=CF—OR_f$, wherein $R_f$ can be a branched or linear perfluoroalkyl radicals of 1-8 carbons and can itself contain additional heteroatoms such as oxygen. Specific examples are perfluoromethyl vinyl ether, perfluoropropyl vinyl ethers, perfluoro(3-methoxy-propyl) vinyl ether. Additional examples are found in Worm (WO 00/12574), assigned to 3M, and in Carlson (U.S. Pat. No. 5,214,100).

For the purposes of the present invention, crystalline copolymers with all three constituent monomers shall be hereinafter referred to as THV, while amorphous copolymers consisting of VDF-HFP and optionally TFE is hereinafter referred to as FKM, or FKM elastomers as denoted in ASTM D 1418. THV and FKM elastomers have the general formula (4):

$$—(CF_2—CF_2)_x—(CF_2—CF)_y—(CH_2—CF_3)_z— \atop {\hspace{3.5em} | \atop \hspace{3.5em} CF_3}} \qquad (4)$$

wherein x, y and z are expressed as molar percentages.

For fluorothermoplastics materials (crystalline) such as THV, x is greater than zero and the molar amount of y is typically less than about 15 molar percent. One commercially available form of THV contemplated for use in the present invention is Dyneon™ Fluorothermoplastic THV™ 220, a polymer that is manufactured by Dyneon LLC, of St. Paul, Minn. Other useful fluorothermoplastics meeting these criteria and commercially available, for example, from Dyneon LLC, St. Paul, Minn., are sold under the trade names THV™ 200, THV™ 500, and THV™800. THV™200 is most preferred since it is readily soluble in common organic solvents such as MEK and this facilitates coating and processing, however this is a choice born out of preferred coating behavior and not a limitation of the material used a low refractive index coating.

In addition, other fluoroplastic materials not specifically falling under the criteria of the previous paragraph are also contemplated by the present invention. For example, PVDF-containing fluoroplastic materials having very low molar levels of HFP are also contemplated by the present invention and are sold under the trade name Dyneon™ PVDF 6010 or 3100, available from Dyneon LLC, of St. Paul, Minn.; and Kynar™ 740, 2800, 9301, available from Elf Atochem North America Inc. Further, other fluoroplastic materials are specifically contemplated wherein x is zero and wherein y is between about 0 and 18 percent. Optionally, the microstructure shown in (4) can also contain additional non-fluorinated monomers such as ethylene, propylene, or butylene. Examples of which are commercially available as Dyneon™ ETFE and Dyneon™ HTE fluoroplastics.

For fluoroelastomers compositions (amorphous) useful in the present invention, x can be zero so long as the molar percentage of y is sufficiently high (typically greater than about 18 molar percent) to render the microstructure amorphous. One example of a commercially available elastomeric compound of this type is available from Dyneon LLC, St. Paul, Minn., under the trade name Dyneon™ Fluoroelastomer FC 2145.

Additional fluoroelastomer compositions useful in the present invention exist where x is greater than zero. Such materials are often referred to as elastomeric TFE containing terpolymers. One example of a commercially available elastomeric compound of this type is available from Dyneon LLC, St. Paul, Minn., and is sold under the trade name Dyneon™ Fluoroelastomer FT 2430.

In addition, other fluorelastomeric compositions not classified under the preceding paragraphs are also useful in the present invention. For example, propylene-containing fluoroelastomers are a class useful in this invention. Examples of propylene-containing fluoroelastomers known as base resistant elastomers ("BRE") and are commercially available from Dyneon under the trade name Dyneon™ BRE 7200 available from 3M Company of St. Paul, Minn. Other examples of TFE-propylene copolymer can also be used are commercially available under the tradename Aflaf™, available from Asahi Glass Company of Charlotte, N.C.

In one preferred approach, these polymer compositions further comprise reactive functionality such as halogen-containing cure site monomers ("CSM") and/or halogenated endgroups, which are interpolymerized into the polymer microstructure using numerous techniques known in the art. These halogen groups provide reactivity towards the other components of coating mixture and facilitate the formation of the polymer network. Useful halogen-containing monomers are well known in the art and typical examples are found in U.S. Pat. No. 4,214,060 to Apotheker et al., European Patent No. EP398241 to Moore, and European Patent No. EP407937B1 to Vincenzo et al.

In addition to halogen containing cure site monomers, it is conceivable to incorporate nitrile-containing cure site monomers in the fluoropolymer microstructure. Such CSM's are particularly useful when the polymers are perfluorinated, i.e. contain no VDF or other hydrogen containing monomers. Specific nitrile-containing CSM's contemplated by this invention are described in Grootaret et al. (U.S. Pat. No. 6,720,360, assigned to 3M).

Optionally halogen cure sites can be introduced into the polymer microstructure via the judicious use of halogenated chain transfer agents which produce fluoropolymer chain ends that contain reactive halogen endgroups. Such chain transfer agents ("CTA") are well known in the literature and typical examples are: Br—$CF_2CF_2$—Br, $CF_2Br_2$, $CF_2I_2$, $CH_2I_2$. Other typical examples are found in U.S. Pat. No. 4,000,356 to Weisgerber. Whether the halogen is incorporated into the polymer microstructure by means of a CSM or CTA agent or both is not particularly relevant as both result in a fluoropolymer which is more reactive towards UV crosslinking and coreaction with other components of the network such as the acrylates. An advantage to use of cure site monomers in forming the co-crosslinked network, as opposed to a dehydrofluorination approach (discussed below), is that the optical clarity of the formed polymer layer is not compromised since the reaction of the acrylate and the fluoropolymer does not rely on unsaturation in the polymer backbone in order to react. Thus, a bromo-containing fluoroelastomer such as Dyneon™ E-15472, E-18905, or E-18402 available from Dyneon LLC of St. Paul, Minn., may be used in conjunction with, or in place of, THV or FKM as the fluoropolymer.

In another embodiment the fluoropolymer microstructure is first dehydrofluorinated by any method that will provide sufficient carbon-carbon unsaturation of the fluoropolymer to create increased bond strength between the fluoropolymer and a hydrocarbon substrate or layer. The dehydrofluorination process is a well-known process to induced unsaturation and it is used most commonly for the ionic crosslinking of fluoroelastomers by nucleophiles such as diphenols and diamines. This reaction is an inherent property of VDF containing elastomers or THV. A descriptions can be found in *The Chemistry of Fluorocarbon Elastomer*, A. L. Logothetis, Prog. Polymer Science (1989), 14, 251. Furthermore, such a reaction is also possible with primary and secondary aliphatic monofunctional amines and will produce a DHF-fluoropolymer with a pendent amine side group. However, such a DHF reaction is not possible in polymers which do not contain VDF units since they lack the ability to lose HF by such reagents.

In addition to the main types of fluoropolymers useful in the context of this invention, there is a third special case involving the use of perfluoropolymers or ethylene containing fluoropolymers which are exempt form the DHF addition reaction described above but nonetheless are reactive photochemically with amines to produce low index fluoropolymer coatings. Examples of such are copolymers of TFE with HFP or perfluorovinyl ethers, or 2,2-bistrifluoromethyl-4,5-difluoro 1,3dioxole. Such perfluoropolymers are commercially available as Dyneon™ Perfluoroelastomer, DuPont Kalrez™ or DuPont Teflon™ AF. Examples of ethylene containing fluoropolymers are known as Dyneon™ HTE or Dyneon™, ETFE copolymers. Such polymers are described in the above-mentioned reference of Scheirs Chapters 15, 19 and 22. Although these polymers are not readily soluble in typical organic solvents, they can be solubilized in such perfluoroinated solvents such as HFE 7100 and HFE 7200 (available from 3M Company, St. Paul, Minn.). These types of fluoropolymers are not easily bonded to other polymers or substrates. However the work of Jing et al, in U.S. Pat. Nos. 6,685,793 and 6,630,047, teaches methods where by such materials can be photochemcially grafted and bonded to other substrates in the presence of amines. However in these particular applications the concept of solution coatings and co-crosslinking in the presence of multifunctional acrylates is not contemplated.

Of course, as one of ordinary skill recognizes, other fluoropolymers and fluoroelastomers not specifically listed above may be available for use in the present invention. As such, the above listings should not be considered limiting, but merely indicative of the wide variety of commercially available products that can be utilized.

The compatible organic solvent that is utilized in the preferred embodiments of the present invention is methyl ethyl ketone ("MEK"). However, other organic solvents including fluorinated solvents may also be utilized, as well as mixtures of compatible organic solvents, and still fall within the spirit and scope of the present invention. For example, other organic solvents contemplated include acetone, cyclohexanone, methyl isobutyl ketone ("MIBK"), methyl amyl ketone ("MAK"), tetrahydrofuran ("THF"), methyl acetate, isopropyl alcohol ("IPA"), and mixtures thereof, may also be utilized.

Amino-substituted Organosilane Ester or Ester Equivalent

The amino-substituted organosilane ester or ester equivalent bears on the silicon atom at least one ester or ester equivalent group, preferably 2, or more preferably 3 groups. Ester equivalents are well known to those skilled in the art and include compounds such as silane amides (RNR'Si), silane alkanoates (RC(O)OSi), Si—O—Si, SiN(R)—Si, SiSR and RCONR'Si. These ester equivalents may also be cyclic such as those derived from ethylene glycol, ethanolamine, ethylenediamine and their amides. R and R' are defined as in the "ester equivalent" definition in the Summary. Another such cyclic example of an ester equivalent (5):

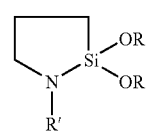

(5)

In this cyclic example R' is as defined in the preceding sentence except that it may not be aryl. 3-aminopropyl alkoxysilanes are well known to cyclize on heating and these RNHSi compounds would be useful in this invention. Preferably the amino-substituted organosilane ester or ester equivalent has ester groups such as methoxy that are easily volatilized as methanol so as to avoid leaving residue at the interface that may interfere with bonding. The amino-substituted organosilane must have at least one ester equivalent; for example, it may be a trialkoxysilane. For example, the amino-substituted organosilane may have the formula (Z2N-L-SiX'X"X'"), where Z is hydrogen, alkyl, or substituted aryl or alkyl including amino-substituted alkyl; where L is a divalent straight chain C1-12 alkylene or may comprise a C3-8 cycloalkylene, 3-8 membered ring heterocycloalkylene, C2-12 alkenylene, C4-8 cycloalkenylene, 3-8 membered ring heterocycloalkenylene or heteroarylene unit. L may be divalent aromatic or may be interrupted by one or more divalent aromatic groups or heteroatomic groups. The aromatic group may include a heteroaromatic. The heteroatom is preferably nitrogen, sulfur or oxygen. L is optionally substituted with C1-4 alkyl, C2-4 alkenyl, C2-4 alkynyl, C1-4 alkoxy, amino, C3-6 cycloalkyl, 3-6 membered heterocycloalkyl, monocyclic aryl, 5-6 membered ring heteroaryl, C1-4 alkylcarbonyloxy, C1-4 alkyloxycarbonyl, C1-4 alkylcarbonyl, formyl, C1-4 alkylcarbonylamino, or C1-4 aminocarbonyl. L is further optionally interrupted by —O—, —S—, —N(Rc)—, —N(Rc)—C(O)—, —N(Rc)—C(O)—O—, —O—C(O)—N(Rc)—, —N(Rc)—C(O)—N(Rd)—, —O—C(O)—, —C(O)—O—, or —O—C(O)—O—. Each of Rc and Rd, independently, is hydrogen, alkyl, alkenyl, alkynyl, alkoxyalkyl, aminoalkyl (primary, secondary or tertiary), or haloalkyl; and each of X', X" and X'" is a C1-18 alkyl, halogen, C1-8 alkoxy, C1-8 alkylcarbonyloxy, or amino group, with the proviso that at least one of X', X", and X'" is a labile group. Further, any two or all of X', X" and X'" may be joined through a covalent bond. The amino group may be an alkylamino group.

Examples of amino-substituted organosilanes include 3-aminopropyltrimethoxysilane (SILQUEST A-1110); 3-aminopropyltriethoxysilane (SILQUEST A-1100); 3-(2-aminoethyl)aminopropyltrimethoxysilane (SILQUEST A-1120); SILQUEST A-1130, (aminoethylaminomethyl) phenethyltrimethoxysilane; (aminoethylaminomethyl)phenethyltriethoxysilane; N-(2-aminoethyl)-3-aminopropylmethyldimethoxysilane (SILQUEST A-2120), bis-(γ-triethoxysilylpropyl) amine (SILQUEST A-1170); N-(2-aminoethyl)-3-aminopropyltributoxysilane; 6-(aminohexylaminopropyl)trimethoxysilane; 4-aminobutyltrimethoxysilane; 4-aminobutyltriethoxysilane; p-(2-aminoethyl)phenyltrimethoxysilane; 3-aminopropyltris(methoxyethoxyethoxy)silane; 3-aminopropylmethyldiethoxysilane; oligomeric aminosilanes such as DYNASYLAN 1146, 3-(N-methylamino)propyltrimethoxysilane; N-(2-aminoethyl)-3-aminopropylmethyldimethoxysilane; N-(2-aminoethyl)-3-aminopropylmethyldiethoxysilane; N-(2-aminoethyl)-3-aminopropyltrimethoxysilane; N-(2-aminoethyl)-3-aminopropyltriethoxysilane; 3-aminopropylmethyldiethoxysilane; 3-aminopropylmethyldimethoxysilane; 3-aminopropyldimethylmethoxysilane; 3-aminopropyldimethylethoxysilane; 4-aminophenyltrimethoxy silane; 3-phenylaminopropyltrimethoxy silane; 2,2-dimethoxy-1-aza-2-silacyclopentane-1-ethanamine (6); 2,2-diethoxy-1-aza-2-silacyclopentane-1-ethanamine (7); 2,2-diethoxy-1-aza-2-silacyclopentane (8); and 2,2-dimethoxy-1-aza-2-silacyclopentane (9).

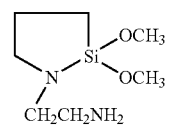

(6)

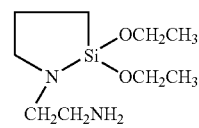

(7)

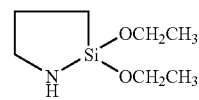

(8)

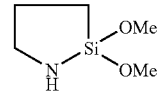

(9)

Additional "precursor" compounds such as a bis-silyl urea [RO)$_3$Si(CH$_2$)NR]$_2$C=O are also examples of amino-substituted organosilane ester or ester equivalents that liberate amine by first dissociating thermally.

The amino-substituted organosilane ester or ester equivalent is preferably introduced diluted in an organic solvent such as ethyl acetate or methanol or methyl acetate. One preferred amino-substituted organosilane ester or ester equivalent is 3-aminopropyl methoxy silane (H$_2$N—(CH$_2$)$_3$—Si(OMe)$_3$), or its oligomers.

One such oligomer is SILQUEST A-1106, manufactured by Osi Specialties (GE Silicones) of Paris, France. The amino-substituted organosilane ester or ester equivalent reacts with the fluoropolymer in a process described further below to provide pendent siloxy groups that are available for forming siloxane bonds with other antireflection layers to improve interfacial adhesion between the layers. The coupling agent thus acts as an adhesion promoter between the layers.

Multi-Olefinic Crosslinking Agent

The crosslinking agent of the present invention is based on a multi-olefinic crosslinking agent. More preferably, the multi-olefinic crosslinker in one that can be homopolymerizable. Most preferably, the multi-olefinic crosslinker is a multi-acrylate crosslinker.

Useful crosslinking acrylate agents include, for example, poly (meth)acryl monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; (d) oligomeric (meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company of Exton, Pa.; UCB Chemicals Corporation of Smyrna, Ga.; and Aldrich Chemical Company of Milwaukee, Wis. Additional useful (meth)acrylate materials include hydantoin moiety-containing poly(meth) acrylates, for example, as described in U.S. Pat. No. 4,262,072 (Wendling et al.).

A preferred crosslinking agent comprises at least three (meth)acrylate functional groups. Preferred commercially available crosslinking agents include those available from Sartomer Company of Exton, Pa. such as trimethylolpropane triacrylate (TMPTA) available under the trade designation "SR351", pentaerythritol tri/tetraacrylate (PETA) available under the trade designation "SR444" or "SR494", and dipentaerythritol hexaacrylate available under the trade designation "SR399." Further, mixtures of multifunctional and lower functional acrylates (monofunctional acrylates), such as a mixture of TMPTA and MMA (methyl methacrylate), may also be utilized.

Other preferred crosslinkers that may be utilized in the present invention include fluorinated acrylates exemplified by perfluoropolyether acrylates. These perfluoropolyether acrylates are based on monofunctional acrylate and/or multiacrylate derivatives of hexafluoropropylene oxide ("HFPO") and may be used as the sole crosslinker, or more preferably, in conjunction with TMPTA or PETA.

Many types of olefinic compounds such as divinyl benzene or 1,7-cotadiene and others like might be expected to behave as crosslinkers under the present conditions.

Perfluoropolyether mono- or multi-acrylates were also used to interact with the fluoropolymers, especially bromo-containing fluoropolymers, for further improving surface properties and lowering refractive indices. Such acrylates provide hydro and olephobicity properties typical of fluorochemical surfaces to provide anti-soiling, release and lubricative treatments for a wide range of substrates without affecting optical properties.

As used in the examples, "HFPO-" refers to the end group $F\{CF(CF_3)CF_2O\}aCF(CF_3)$— wherein "a" averages about 6.3, with an average molecular weight of 1,211 g/mol, and which can be prepared according to the method reported in U.S. Pat. No. 3,250,808 (Moore et al.), the disclosure of which is incorporated herein by reference, with purification by fractional distillation.

Surface Modified Nanoparticles

The mechanical durability of the resultant low refractive index layers 20 can be enhanced by the introduction of surface modified inorganic particles.

These inorganic particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the hardcoat. The inorganic oxide particles are typically colloidal in size, having an average particle diameter of 5 nanometers to 100 nanometers. These size ranges facilitate dispersion of the inorganic oxide particles into the binder resin and provide ceramers with desirable surface properties and optical clarity. The average particle size of the inorganic oxide particles can be measured using transmission electron microscopy to count the number of inorganic oxide particles of a given diameter. Inorganic oxide particles include colloidal silica, colloidal titania, colloidal alumina, colloidal zirconia, colloidal vanadia, colloidal chromia, colloidal iron oxide, colloidal antimony oxide, colloidal tin oxide, and mixtures thereof. Most preferably, the particles are formed of silicon dioxide ($SiO_2$).

The surface particles are modified with polymer coatings designed to have alkyl or fluoroinated alkyl groups, and mixtures thereof, that have reactive functionality towards the fluoropolymer. Such functionalities include mercaptan, vinyl, acrylate and others believed to enhance the interaction between the inorganic particles and low index fluoropolymers, especially those containing chloro, bromo, iodo or alkoxysilane cure site monomers. Specific surface modifying agents contemplated by this invention include but are not limited to 3-methacryloxypropyltrimethoxysilane A174 OSI Specialties Chemical), vinyl trialkoxy silanes such as trimethoxy and triethoxy silane and hexamethydisilizane (available from Aldrich Co).

These vinylidene fluoride containing fluoropolymers are known to enable grafting with chemical species having nucleophilic groups such as —$NH_2$, —SH, and —OH via dehydrofluorination and Michael addition processes.

Sol Gel Precursor

Reagents such as TEOS or Vinyl TEOS are well known to form stable three-dimensional silica networks (i.e. siloxane networks). The introduction of TEOS or Vinyl TEOS to the composition of the low refractive index layer 20 therefore enhances the mechanical durability and scratch resistance of the cured coating by forming the afore-mentioned network within cured coating layer.

While TEOS and Vinyl TEOS are preferred in the present invention, other tetralkoxysilane and trialkoxysilane materials may be utilized as the sol gel precursor. For example, other trialkoxysilane materials include methyl trialkoxysilane, ethyl trialkoxysilane, and higher alkyl trialkoxysilanes.

Photoinitiators and Additives

To facilitate curing, polymerizable compositions according to the present invention may further comprise at least one free-radical photoinitiator. Typically, if such an initiator photoinitiator is present, it comprises less than about 10 percent by weight, more typically less than about 5 percent of the polymerizable composition, based on the total weight of the polymerizable composition.

Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. No. 4,654,233 (Grant et al.); U.S. Pat. No. 4,855,184 (Klun et al.); and U.S. Pat. No. 6,224,949 (Wright et al.).

Useful free-radical photoinitiators include, for example, those known as useful in the UV cure of acrylate polymers. Such initiators include benzophenone and its derivatives; benzoin, alpha-methylbenzoin, alpha-phenylbenzoin, alpha-allylbenzoin, alpha-benzylbenzoin; benzoin ethers such as benzil dimethyl ketal (commercially available under the trade designation "IRGACURE 651" from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (commercially available under the trade designation "DAROCUR 1173" from Ciba Specialty Chemicals Corporation) and 1-hydroxycyclohexyl phenyl ketone (commercially available under the trade designation "IRGACURE 184", also from Ciba Specialty Chemicals Corporation); 2-methyl-1-[4-(methylthio)phenyl]-2-(4-morpholinyl)-1-propanone commercially available under the trade designation "IRGACURE 907", also from Ciba Specialty Chemicals Corporation); 2-benzyl-2-(dimethylamino)-1-[4-(4-morpholinyl)phenyl]-1-butanone commercially available under the trade designation "IRGACURE 369" from Ciba Specialty Chemicals Corporation); aromatic ketones such as benzophenone and its derivatives and anthraquinone and its derivatives; onium salts such as diazonium salts, iodonium salts, sulfonium salts; titanium complexes such as, for example, that which is commercially available under the trade designation "CGI 784 DC", also from Ciba Specialty Chemicals Corporation); halomethylnitrobenzenes; and mono- and bis-acylphosphines such as those available from Ciba Specialty Chemicals Corporation under the trade designations "IRGACURE 1700", "IRGACURE 1800", "IRGACURE 1850", "IRGACURE 819", "IRGACURE 2005", "IRGACURE 2010", "IRGACURE 2020" and "DAROCUR 4265". Combinations of two or more photoinitiators may be used. Further, sensitizers such as 2-isopropyl thioxanthone, commercially available from First Chemical Corporation, Pascagoula, Miss., may be used in conjunction with photoinitiator(s) such as "IRGACURE 369".

More preferably, the initiators used in the present invention are either "DAROCURE 1173" or "ESACURE® KB-1", a benzildimethylketal photoinitiator available from Lamberti S.p.A of Gallarate, Spain.

Alternatively, or in conjunction herewith, the use of thermal initiators may also be incorporated into the reaction mixture. Useful free-radical thermal initiators include, for example, azo, peroxide, persulfate, and redox initiators, and combinations thereof.

Those skilled in the art appreciate that the coating compositions can contain other optional adjuvants, such as, surfactants, antistatic agents (e.g., conductive polymers), leveling agents, photosensitizers, ultraviolet ("UV") absorbers, stabilizers, antioxidants, lubricants, pigments, dyes, plasticizers, suspending agents and the like.

The reaction mechanism for forming the low refractive index composition (REACTION MECHANISM 1) is described in further detail below:

Reaction Mechanism 1

The low refractive index coating composition of the present invention used to form layer 20, in one preferred approach, is formed by first forming an amino-silane modified fluoropolymer and then reactively photo-crosslinking the amino-silane modified fluoropolymer with a multi-olefinic (here acrylate) crosslinker (including fluorinated acrylates). The mechanism for forming the coating composition involves three distinct steps as described below:

Step 1: Formation of Amino Silane Modified Fluoropolymer

In Reaction Mechanism 1, a fluoropolymer as described above is first dissolved in a compatible organic solvent. Preferably, the solution is about 10% by weight fluoropolymer and 90% by weight organic solvent. Optionally, surface modified nanoparticles as described above may be added to the fluoropolymer solution in amounts not exceeding about 5-10% by weight of the overall low refractive index composition.

The compatible organic solvent that is utilized in the preferred embodiments of the present invention is methyl ethyl ketone ("MEK"). However, other organic solvents including organic fluorinated solvents may also be utilized, as well as mixtures of compatible organic solvents, and still fall within the spirit and scope of the present invention. For example, other organic solvents contemplated include acetone, cyclohexanone, methyl isobutyl ketone ("MIBK"), methyl amyl ketone ("MAK"), tetrahydrofuran ("THF"), isopropyl alcohol ("IPA"), or mixtures thereof, may also be utilized.

Next, a solution of amino-substituted organosilane ester or ester equivalent (either 3-aminopropyl methoxy silane or its oligomer (A1106)) is added to the fluoropolymer solution.

The mixture is allowed to sit for a sufficient period of time (typically between about a few hours and a few days) to fully react the mixture to form an amino-silane modified fluoropolymer.

The reaction mechanism for forming the aminosilane modified fluoropolymer preferentially and substantially occurs at vinylidene fluoride groups that are located next to HFP groups in the THV or FKM molecules. The reaction mechanism (10) is a dehydrofluorination reaction of the VDF group followed by an HF elimination reaction and is described chemically below (for illustrative purposes, 3-aminopropyl methoxy silane is utilized as the amino-substituted organosilane ester or ester equivalent):

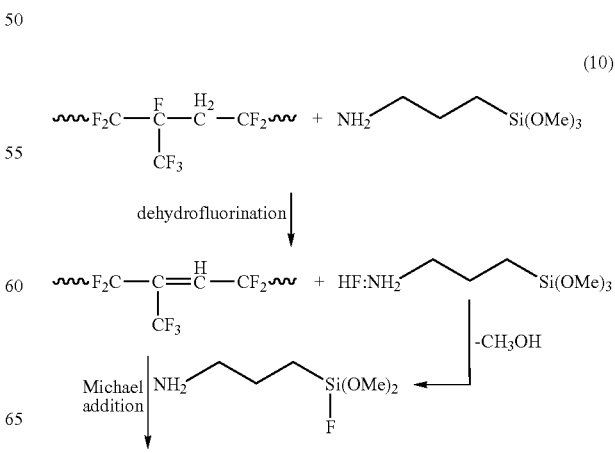

(10)

-continued

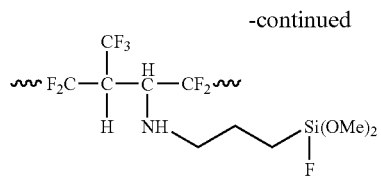

The reaction is limited by the number of VDF groups coupled to the HFP groups contained in the fluoropolymer. As a result, excess amino silane coupling agent in solution has little, if any, additional chemical effect. The amino-substituted organosilane ester or ester equivalent is added in a range of between about 5 and 10 weight percent of the total mixture.

Step 2: Introduction of the Multi-Olefinic Crosslinker to the Aminosilane Modified Fluoropolymer and Subsequent Application to a Substrate Material A C=C double bond containing olefinic crosslinker such as a multifunctional (meth)acrylate, including fluorinated acrylates, is then introduced to the container having the aminosilane modified fluoropolymer formed in Step 1.

The resultant composition is then applied as a wet layer either (1) directly to an optical substrate 16 or hardcoated optical substrate, or (2) to a high refractive index layer, or (3) to a release layer of a transferable film. The optical substrate 16 could be glass or a polymeric material such as polyethylene terephthalate (PET).

Next, the wet layer is dried at between about 100 and 120 degrees Celsius in an air oven for about ten minutes to form a dry layer (i.e. coated subject).

Step 3: Crosslinking Reaction

Next, the coated subject is irradiated with an ultraviolet light source from a UV processor to induce radical-initiating crosslinking of the multifunctional (meth)acrylate, which copolymerizes with the multi-acrylate modified aminosilane modified fluoropolymer. Preferably, the coated subject is subjected to ultraviolet radiation by H-bulb or by a 254-nanometer (nm) lamp in one or more passes along a conveyor belt. The UV processor preferably used is Fusion UV, Model MC-6RQN with H-bulb, made by Fusion UV Systems, Inc. of Gaithersburg, Md.

Alternatively, the coated subject can be thermally crosslinked by applying heat and a suitable radical initiator such as a peroxide compound.

EXAMPLES

The following paragraphs illustrate, via a specific set of example reactions and experimental methodologies, the improvements of each of the component steps for forming the low refractive index composition of the present invention. The paragraphs detail test methods, ingredients, and experimental tests done to confirm the improvements of each component step.

A. Test Methods

1. Peel Strength

A peel strength was used to determine interfacial adhesion. To facilitate testing of the adhesion between the layers via a T-peel test, a thick film (20 mil (0.51 mm)) of THV 220 or FC 2145 was laminated onto the side of the films with the fluoropolymer coating in order to gain enough thickness for peel measurement. In some cases, a slight force was applied to the laminated sheet to keep a good surface contact. A strip of PTFE fiber sheet was inserted about 0.25 inch (0.64 mm) along the short edge of the 2 inch×3 inch (5.08 cm×7.62 cm) laminated sheet between the substrate surface and the fluoropolymer film to provide unbonded region to act as tabs for the peel test. The laminated sheet was then pressed at 200° C. for 2 minutes between heated platens of a Wabash Hydraulic Press (Wabash Metal Products Company, Inc., Hydraulic Division, Wabash, Ind.) and immediately transferred to a cold press. After cooling to room temperature by the cold press, the resulting sample was subjected to T-peel measurement.

Peel strengths of the laminated samples were determined following the test procedures described in ASTM D-1876 entitled "Standard Test Method for Peel Resistance of Adhesives," more commonly known as the "T-peel" test. Peel data was generated using an INSTRON Model 1125 Tester (available from Instron Corp., Canton, Mass.) equipped with a Sintech Tester 20 (available from MTS Systems Corporation, Eden Prairie, Minn.). The INSTRON tester was operated at a cross-head speed of 4 inches/min (10.2 cm/min). Peel strength was calculated as the average load measured during the peel test and reported in pounds per inch (lb/inch) width (and N/cm) as an average of at least two samples.

2. Boiling Water Test

In the boiling water test, the coated sample was placed in boiling water for 2 hours. The sample was removed, and an inspection was performed on the sample to see if the low refractive index layer delaminated from the substrate.

3. Cheese Cloth Durability Testing

The abrasion resistance of the cured films of the present invention was tested cross-web (perpendicular) to the coating direction by a mechanical device capable of oscillating cheesecloth fastened to a stylus by means of a rubber gasket across the film's surface. The stylus oscillated over a 10 cm wide sweep width at a rate of 3.5 wipes/second wherein a "wipe" is defined as a single travel of 10 cm. The stylus had a flat, cylindrical geometry with a diameter of 1.25 inch (3.2 cm). The device was equipped with a platform on which weights were placed to increase the force exerted by the stylus normal to the film's surface. The cheesecloth was obtained from Summers Optical, EMS Packaging, A subdivision of EMS Acquisition Corp., Hatsfield, Pa. under the trade designation "Mil Spec CCC-c-440 Product # S12905". The cheesecloth was folded into 12 layers. The data are reported as the number of wipes and weight in grams needed scratch the films surface.

4. Linear Scratch Testing

Scratch resistance of the coated films was accomplished by means of mechanical apparatus which can accelerate a diamond-graphite stylus across the surface of the film. The stylus has a diameter of 750 um and a 160° cone angle at the tip, unless otherwise noted. The Linear Scratch Apparatus Model 4138, is available from Anorad Products, Hauppauge, N.Y. The diamond tipped styli are available from Graff Diamond Products Limited, Brampton, Ontario, Canada. The styli are accelerated across the surface of the film at 20 ft/min (6.7 m/min) for 4 inches (10.2 cm). The holder is equipped with a known weight applied normal to the surface of the film. The film is tested until failure. If a scratch was noted on the surface it was further evaluated by means of optical microscope (Axiotron™ Microscope with Axio-Imager, available from Zeiss of Goetting, Germany) with a video interface (available from Optronics-Terra Universal of Anaheim, Calif.). The optical power was set at 10× and the nature of the damage was noted as: 1) no scratch ("NS"); 2) slight scratch ("SS"); 3) partial delamination ("PD"); and 4) full delamination ("FD"). Thus, for example, a sample that tests "FD-50 g" achieved full delamination using a 50-gram weight.

5. Sand Test

In this abrasion test, a circular piece of film is subjected to sand abrasion by means of an oscillating laboratory shaker, (Model DS 500E Orbital shaker available from VWR of W. Chester, Pa.). The percent change in reflection ("Δ % R") is used to determine the overall loss of the AR coating. Therefore, values reported with lower Δ % R exhibited improved sand abrasion resistance. The procedure for performing the sand test is achieved by first die cutting a coated film to a diameter of 90 mm. The middle of the film is marked on the uncoated side of the film with a 25 mm diameter circle to identify the "optical zone" where the before and after % R measurements will be made. The % R in this "optical zone" is measured at 550 nm by means of a Perkin-Elmer Lamda 900 UV-Vis-NIR spectrometer in the reflection mode. The film was placed coated side up in the lid of a 16 oz glass jar. (The jars are straight-sided, clear glass jars model WS-216922 available from Valu-Bulk™ Wheaton Glass Bottles Millville, N.J.). The sand was Ottawa Sand Standard, 20-30 mesh, and conforms to ASTM Standard C-190 T-132 and was obtained from VWR of W. Chester, Pa. The jar is placed in the shaker upside-down and secured into the oscillating shaker so the sand is in contact with the coated side of the film. The test assembly is oscillated for 15 min 25 sec at 250 rpm's. (Note, the 25 seconds allows the shaker to ramp up to the full 250 rpm's.) After this test time, the film is removed from the lid. The coated surface is wiped with a soft cloth dampened with 2-propanol and the percent reflection is measured at 550 nm in the same optical zone as before. The change in reflection (Δ % R) is determined by the following relationship (11):

$$\Delta \% R = (R_f - R_i)/(R_h - R_i) \times 100 \quad (11)$$

wherein % $R_f$ is the measured reflection after abrasion, $R_i$ is the initial reflection and $R_h$ is the reflection of the untreated hardcoat on PET. The reported values are the average of 3 different films for each example.

B. Ingredients

The ingredients used for forming the various coatings of this invention are summarized in the following paragraphs.

Dyneon™ THV™ 220 Fluoroplastic (20 MFI, ASTM D 1238) is available as either a 30% solids latex grade under the trade name of Dyneon™ THV™ 220D Fluoroplastic dispersion, or as a pellet grade under the trade name of Dyneon™ THV™ 220G. Both are available from Dyneon LLC of St. Paul, Minn. In the case of Dyneon™ THV™ 220D, a coagulation step is necessary to isolate the polymer as a solid resin. The process for this is described below.

Dyneon™ FT 2430 and Dyneon™ FC 2145 fluoroelastomers are about 70 weight percent fluorine terpolymer and about 66 weight percent fluorine copolymers respectively, both available from Dyneon LLC of St. Paul, Minn. and were used as received.

Trimethylolpropane triacrylate SR 351 ("TMPTA") and Di-Pentaerythritol tri acrylate (SR 399LV) were obtained from Sartomer Company of Exton, Pa. and used as received.

Acryloyl chloride was obtained from Sigma-Aldrich and used without further purification.

3-methacryloxypropyltrimethoxysilane available as A174 OSI Specialties Chemical was used as received.

3-aminopropyl triethoxy silane (3-APS) is available form Aldrich Chemical Milwaukee, Wis. and was used as received.

A1106-Silquest, manufactured by Osi Specialties (GE Silicones) of Paris, France.

"Darocur 1173" 2-hydroxy 2-methyl 1-phenyl propanone UV photoinitiator, and Irgacure™ 819 were obtained from Ciba Specialty Products of Terrytown, N.Y. and used as received.

"KB-1" benzyl dimethyl ketal UV photoinitiator was obtained from Sartomer Company of Exton, Pa. and was used as received.

Dowanol™, 1-methoxy-2-propanol was obtained from Sigma-Aldrich of Milwaukee, Wis. and used as received.

SR295, mixture of pentaerythritol tri and tetraacrylate, CN 120Z, Acrylated bisphenol A, SR 339, Phenoxyethyl acrylate, were obtained from Sartomer Chemical Company of Exton, Pa. and used as received.

(3-Acryloxypropyl)trimethoxysilane, was obtain from Gelest of Morrisville, Pa. and was used as received.

A1230, polyether silane was obtained from OSI Specialties and was used as received.

Buhler zirconia ($ZrO_2$), grades Z-WO and Z-WOS, were obtained from Buhler of Uzweil, Switzerland and modified as described in the preparation of (S3) and (S4) described below.

Oligomeric hexafluoropropylene oxide methyl ester (HFPO—C(O)OCH$_3$) can be prepared according to the method reported in U.S. Pat. No. 3,250,808 (Moore et al.). The broad product distribution of oligomers obtained from this preparation can be fractionated according to the method described in U.S. patent application Ser. No. 10/331,816, filed Dec. 30, 2002. This step yields the higher molecular weight distribution of oligomers used in this description wherein the number average degree of polymerization is about 6.3, and with an average molecular weight of 1,211 g/mol.

1. Coagulation of Dyneon™ THV™ 220D latex

The solid THV 220 resin derived from THV 220D latex can be obtained by freeze coagulation. In a typical procedure, 1-L of latex was placed in a plastic container and allowed to freeze at −18° C. for 16 hrs. The solids were allowed to thaw and the coagulated polymer was separated from the water phase by simple filtration. The solid polymer was than further divided into smaller pieces and washed 3-times with about 2 liters of hot water while being agitated. The polymer was collected and dried at 70-80° C. for 16 hours. Note whether THV 220D or THV 220G was used as the source of the preparation of the THV 220 solution, they are for the purposes of this application considered an equivalent.

2. Preparation of hexafluoropropylene oxide N-methyl-1,3-propanediamine adduct

A 1-liter round-bottom flask was charged with 291.24 g (0.2405 mol) of FC-1 and 21.2 g (0.2405 mol) N-methyl-1,3-propanediamine, both at room temperature, resulting in a cloudy solution. The flask was swirled and the temperature of the mixture rose to 45° C., and to give a water-white liquid, which was heated overnight at 55° C. The product was then placed on a rotary evaporator at 75° C. and 28 inches of Hg vacuum to remove methanol, yielding 301.88 g of a viscous slightly yellow liquid, the hexafluoropropylene oxide N-methyl-1,3-propanediamine adduct.

3. Preparation of HFPO-acrylate-3

To a 250 ml roundbottom flask was charged with 4.48 g (15.2 mmoles, based on a nominal MW of 294) of trimethylolpropane triacrylate (TMPTA, Sartomer SR351), 4.45 g of tetrahydrofuran (THF), and 1.6 mg of phenothiazine and placed in an oil bath at 55 C. Next, in a 100 ml jar was dissolved 20 g (15.78 mmole, MW 1267.15) hexafluoropropylene oxide N-methyl-1,3-propanediamine adduct in 32 g THF. This solution was placed in a 60 ml dropping funnel with pressure equalizing sidearm, the jar rinsed with about 3 ml of THF, which was also added to the dropping funnel. The contents of the funnel were added over 38 minutes under an air atmosphere to the TMPTA/THF/phenothiazine mixture. The reaction was cloudy at first, but cleared at about 30 minutes. Twenty minutes after the addition was complete, the reaction flask was placed on a rotary evaporator at 45-55 rpm under 28 inches of vacuum to yield 24.38 g of a clear, viscous yellow liquid, that was characterized by NMR and HPLC/mass spectroscopy.

4. Preparation of modified 20-nm colloidal silicon dioxide particles 15 g of 2327 (20-nm ammonium stabilized colloidal silica sol, 41% solids; Nalco, Naperville, Ill.) were placed in a 200 ml glass jar. A solution of 10 g of 1-methoxy-2-propanol (Aldrich) containing 0.57 g of vinyltrimethoxysilane (Gelest, Inc., Tullytown, Pa.) was prepared in a separate flask. The vinyltrimethoxysilane solution was added to the glass jar while the silica sol was stirred. The flask was then rinsed with an additional 5-ml of solvent and added to the stirred solution. After complete addition, the jar was capped and placed in an oven at 90 degrees Celsius for about 20 hours. The sol was then dried by exposure to gentle airflow at room temperature. The powdery white solid was collected and dispersed in 50 ml of THF solvent. 2.05 g of HMDS (excess) were slowly added to the THF silica sol, and, after addition, the jar was capped and placed in an ultrasonic bath for about 10 hours. Subsequently, the organic solvent was removed by a rotovap and the remaining white solid heated at 100 degrees Celsius overnight for further reaction and removal of volatile species. The resultant particles are noted below as vinyl modified/HMDS particles.

15 g of 2327 (20 nm ammonium stabilized colloidal silica sol, 41% solids; Nalco, Naperville, Ill.) were placed in a 200-ml glass jar. A solution of 10 g of 1-methoxy-2-propanol (Aldrich) containing 0.47 g of 3-(Trimethoxysilyl)propylmethacrylate (Gelest, Inc., Tullytown, Pa.) was prepared in a separate flask. The 3-(Trimethoxysilyl)propylmethacrylate solution was added to the glass jar while the silica sol was stirred. The flask was then rinsed with an additional 5 ml of solvent and added to the stirred solution. After complete addition, the jar was capped and placed in an oven at 90 degrees Celsius for about 20 hours. The sol was then dried by exposure to gentle airflow at room temperature. The powdery white solid was collected and dispersed in 50 ml of THF solvent. 2.05 g of HMDS (excess) were slowly added to the THF silica sol, and, after addition, the jar was capped and placed in an ultrasonic bath for about 10 hours. Subsequently, the organic solvent was removed by a rotovap and the remaining white solid heated at 100 degrees Celsius overnight for further reaction and removal of volatile species. The resultant particles are noted below as A-174 HMDS particles.

5. Preparation of Modified Fumed Silica

The synthesis of partially acrylic-modified fumed $SiO_2$ was prepared by first making a sol of 2 g of $SiO_2$ (380 $m^2/g$) and 100 ml of 1-methoxy-2-propanol (Aldrich) in a glass jar. 4 g of ammonium hydroxide (30% aqueous solution) and 20 g distilled water were then added slowly into the solution upon stirring. The mixture became a gel. A solution of 20 g of 1-methoxy-2-propanol (Aldrich) containing 0.2 g of 3-(Trimethoxysilyl)propylmethacrylate (Aldrich) was prepared in a separate flask.

The (trimethoxysilyl)propylmethacrylate solution was added to the glass jar while stirring. The flask was then rinsed with an additional 5-10 ml of the solvent and subsequently added to the stirred solution. After complete addition, the jar was capped and placed in an ultrasonic bath at 80 degrees Celsius for between 6 and 8 hours. The solution was then dried in a flow-through oven at room temperature. The powdery white solid was collected and dispersed into 50 ml of THF solvent. 2.05 g of HMDS (excess) was slowly added to the THF powder solution, and, after addition, the jar was capped and placed in an ultrasonic bath for about 10 hours. Subsequently, the organic solvent was removed by a rotovap and the white solid was heated at 100 degrees Celsius overnight for further reaction and removal of volatile species. The resultant particles are noted below as A-174/F-$SiO_2$ particles.

6. Preparation of Particles modified by vinyltriethoxysilane and HMDS

By ultrasonication, a sol containing 2 g of fumed $SiO_2$ (380 $m^2/g$) and 100 ml of 1-methoxy-2-propanol (Aldrich) was prepared in a glass jar. 4 g of ammonium hydroxide (30% aqueous solution) and 20 g distilled water were then added slowly into the solution with stirring. The mixture became a gel. A solution of 20 g of 1-methoxy-2-propanol (Aldrich) containing 0.2 g of vinyl triethoxysilane (Gelest, Inc., Tullytown, Pa.) was prepared in a separate flask. The solution was added to the glass jar while stirring. The flask was then rinsed with an additional 5-10 ml of the solvent and added to the stirred solution. After complete addition, the jar was capped and placed in an ultrasonic bath at 80 degrees Celsius for between 6 to 8 hours. The solution was then dried in gentle airflow at room temperature. The powdery white solid was collected and dispersed into 50 ml of THF solvent. To the dispersed THF sol was slowly added 2.05 g of HMDS (excess). After addition, the jar was capped and placed in an ultrasonic bath for about 10 hours. Subsequently, the organic solvent was removed by a rotovap and the remaining white solid was heated at 100 degrees Celsius overnight for further reaction and removal of volatile species. The resultant particles are noted below as V/F-$SiO_2$ particles.

7. Description of PET Substrate (S1)

One preferred substrate material is polyethylene terephthalate (PET) film obtained from e.i. DuPont de Nemours and Company, Wilmington, Del. under the trade designation "Melinex 618", and having a thickness of 5.0 mils and a primed surface. Referred to in the examples herein as substrate S1.

8. Description of the Hardcoated Substrate (S2)

Typically, the hardcoat is formed by coating a curable liquid ceramer composition onto a substrate, in this case primed PET substrate (S1), and curing the composition in situ to form a hardened film (or hardcoated substrate (S2).

Suitable coating methods include those previously described for application of the fluorochemical surface layer. Further, details concerning hardcoats can be found in U.S. Pat. No. 6,132,861 to Kang et al., U.S. Pat. No. 6,238,798 to Kang et al., U.S. Pat. No. 6,245,833 to Kang et al., and U.S. Pat. No. 6,299,799 to Craig et al. A hardcoat composition that was substantially the same as Example 3 of U.S. Pat. No. 6,299,799 was coated onto the primed surface of (S1) and cured in a UV chamber having less than 50 parts per million (ppm) oxygen. The UV chamber was equipped with a 600 watt H-type bulb from Fusion UV systems of Gaithersburg, Md., operating at full power. The hard coat was applied to (S1) with a metered, precision die coating process using the parameters as described in Table 1. The hard coat was diluted in IPA to 30 weight percent solids and coated onto the 5-mil PET backing to achieve a dry thickness of 5 microns. A flow meter was used to monitor and set the flow rate of the material from a pressurized container. The flow rate was adjusted by changing the air pressure inside the sealed container which forces liquid out through a tube, through a filter, the flow meter and then through the die. The dried and cured film (S2) was wound on a take up roll and used as the input backing for the coating solutions described below.

TABLE 1

Coating and cure conditions for forming (S2)

| | |
|---|---|
| Coating Width: | 6" (15 cm) |
| Web Speed: | 30 feet (9.1 m) per minute |
| Solution % Solids: | 30.2% |
| Filter: | 2.5 micron absolute |
| Pressure Pot: | 1.5 gallon capacity (5.71) |
| Flow Rate: | 35 q/min |
| Wet Coating Thickness: | 24.9 microns |
| Dry Coating Thickness: | 4.9 microns |
| Conventional Oven Temps: | 140° F. (60° C.) Zone 1 |
| | 160° F. (53° C.) Zone 2 |
| | 180° F. (82° C.) Zone 3 |
| Length of Oven: | 10 feet (3 m) |

9. Preparation of High Index Optical Layer (S3)

$ZrO_2$ sol (Buhler Z-WO) (100.24 g 18.01% $ZrO_2$) was charged to a 16 oz jar. Methoxypropanol (101 g), Acryloxypropyl trimethoxy silane (3.65 g) and A1230 (2.47 g) were charged to a 500 ml beaker with stirring. The methoxypropanol mixture was then charged to the $ZrO_2$ sol with stirring. The jar was sealed and heated to 90 degrees Celsius for 4 hours. After heating the mixture was stripped to 52 g via rotary evaporation.

Deionized water (175 g) and concentrated $NH_3$ (3.4 g, 29 wt %) were charged to a 500-milliliter beaker. The above concentrated sol was added to this with minimal stirring. A white precipitate was obtained and isolated as a damp filter cake via vacuum filtration. The damp solids (43 g) were dispersed in acetone (57 g). The mixture was then filtered with fluted filter paper follow by 1-micron filter. The composition of the formed high index formulation, described in Table 2, was isolated at 15.8% solids.

TABLE 2

| wt % $ZrO_2$ nano | Surface Modifier (SM) | wt % SM | wt % Resin | Resins and Ratios | Wt % P.I. on total solids | % solids and solvent |
|---|---|---|---|---|---|---|
| 50% Buhler | 3:1 Acrylate:A1230 | 8.83 | 40.17 | Dipentaerythritol pentaacrylate (SR399) | 1.0% Irgacure™ 819 | 5% in acetone |

The formulation was prepared at the % solids, in the solvent, and with the resins and photoinitiator indicated in the table above, by addition of the surface modified nanoparticles into a jar, followed by the addition of the available resins, initiator and solvents, followed by swirling to yield an even dispersion. (S3) was coated on the substrate (S2) using the same method and coating procedure but with the following parameters:

TABLE 3

Coating and cure conditions for forming (S3)

| | |
|---|---|
| Coating Width: | 4" (10 cm) |
| Web Speed: | 10 feet per minute |
| Pump: | 60 cc Syringe Pump |
| Approximate Flow Rate: | 1.60 cc/min |
| Dry Coating Thickness: | 85 nm |
| UV cure Bulb | D-Bulb |
| Conventional Oven Temps: | 65° C. Zone 1 |
| | 65° C. Zone 2 |
| Length of Oven: | 10 feet (3 m) |

10. Preparation of High Index Optical Layer Substrate (S4)

a. Nanoparticle Preparation: (Buhler $ZrO_2$-75/25 Acryloxypropyltrimethoxy Silane-A1230)

The $ZrO_2$ sol (Buhler Z-WOS) (400.7 g of 23.03% $ZrO_2$) was charged to a 1 qt jar. Methoxypropanol (400 g), Acryloxypropyl trimethoxy silane (18.82 g) and A1230 (12.66 g) were charged to a 1-liter beaker with stirring. The methoxypropanol mixture was then charged to the $ZrO_2$ sol with stirring. The jar was sealed and heated to 90 degrees Celsius for 5.5 hours. After heating the mixture (759 g) was stripped to 230.7 g via rotary evaporation.

Deionized water (700 g) and concentrated $NH_3$ (17.15 g, 29 wt %) were charged to a 4 liter beaker. The above concentrated sol was added to this with minimal stirring. A white precipitate was obtained and isolated as a damp filter cake via vacuum filtration. The damp solids (215 g) were dispersed in methoxypropanol (853 g). The mixture was then concentrated (226 g) via rotary evaporation. Methoxypropanol (200 g) was added and the mixture concentrated (188.78 g) via rotary evaporation. Methoxypropanol was charged (195 g) and the mixture was concentrated (251.2 g) via rotary evaporation. Methoxypropanol (130 g) was charged and the mixture concentrated via rotary evaporation. The final product (244.28) was isolated at 39.9% solids. The mixture was filtered thru a 1-micron filter. The high index coating solution has a composition as listed in Table 4:

TABLE 4

| wt % ZRO2 nano | Surface Modifier (SM) | wt % SM | wt % Resins | Resins and Ratios | Wt % P.I. on total solids | % solids and Solvent |
|---|---|---|---|---|---|---|
| 50 Buhler | 3:1 Acrylate:A1230 | 9 | 40 | 48:35:17 SR295:CN120Z:SR339 | 1.0% Irgacure™ 819 | 7.5% in 10:1 Acetone:Methoxy Propanol |

The formulation was prepared at the % solids, in the solvent, and with the resins and photoinitiator indicated in the table above, by addition of the surface modified nanoparticles into a jar, followed by the addition of the available resins, initiator and solvents, followed by swirling to yield an even dispersion. The high index coating solution was coated on the substrate (S2) using the same method and coating procedure described above but with the following parameters:

TABLE 5

Coating Conditions for the preparation of (S4):

| | |
|---|---|
| Coating Width: | 4" (10 cm) |
| Web Speed: | 10 feet per minute |
| Pump: | 60 cc Syringe Pump |
| Approximate Flow Rate: | 1.18 cc/min |
| Dry Coating Thickness: | 85 nm |
| UV cure Bulb | D-Bulb |
| Conventional Oven Temps: | 65° C. Zone 1 |
| | 65° C. Zone 2 |
| Length of Oven: | 10 feet (3 m) |

C. Experimentation and Verification

The following paragraphs illustrate, via a specific set of example reactions and experimental methodologies, the improvements of each of the component steps for forming the low refractive index composition of the present invention.

Example Set 1

Interfacial Adhesion Improvement Between Fluoropolymers and Substrates

Dyneon™ Fluoroplastic THV™ 220, Dyneon™ fluoroelastomer FC-2145 or brominated fluoroelastomer E-15742 were each dissolved individually in containers with either MEK or ethyl acetate at 5 weight percent by shaking at room temperature. The prepared fluoropolymer solutions were then combined with an aminosilane/methanol solution, such as 3-aminopropyltrimethoxysilane (or A1106 in methanol) in various ratios. The solids were diluted to 3% solids in Methyl ethyl ketone and coated on the substrate with a #3 Meyer Rod. The mixed fluoropolymer/aminosilane solutions were applied to S1 or S2. This gave a calculated dry coating thickness of approximately 100 nm. The coated films were dried briefly, then subjected to heating at 100-120° C. for 10 minutes.

Subsequently the films were further subjected to UV irradiation by H-bulb or by a 254 nanometer (nm) lamp, or simply subjected to heat, or thermal and UV combination as shown in supporting tables. As Tables 6 and 7 illustrate, the resulting films showed excellent interfacial adhesion, which was further evaluated by immersing these films into boiling water for 1 to 3 hours and the results are shown in Table 6.

TABLE 6

Interfacial adhesion between fluoropolymers and substrates promoted by amino silane bonding agents with 254-nm Light Source.

| Substrate | Fluoropolymer (wt %) | Additive (wt %) | Adhesion after 1 hr boiling water |
|---|---|---|---|
| S1 | THV 200 100% | 0 | No adhesion |
| S1 | THV 200 (99.5) | A-1106 (0.5) | Strong |
| S1 | THV 200 (99.0) | A-1106 (1.0) | Strong |
| S1 | FC-2145 (98.0) | A-1106 (2.0) | Strong |
| S1 | FC-2145 (97.0) | A-1106 (3.0) | Strong |
| S2 | THV 200 (95.0) | A-1106 (5.0) | Strong |
| S2 | THV 200 (93.0) | A-1106 (7.0) | Strong |
| S2 | THV 200 (99.5) | 3APS (0.5) | Strong |
| S2 | THV 200 (99.0) | 3APS (1.0) | Strong |
| S2 | THV 200 (98.0) | 3APS (2.0) | Good (no boiling water test) |
| S2 | E-15742 (99.0) | 3APS (1.0) | Good (no boiling water test) |
| S2 | THV 200 (97.5) | Amine-1(*) (2.5) | Strong |

(*)Amine-1 = N-phenylaminopropyltrimethoxysilane

These adhesion results indicate the advantages of using aminosilanes as adhesion promoters in this photochemical process.

Example Set 2

Photocrosslinking/Photografting of Fluoropolymers

The above prepared fluoropolymer solutions in Example 1 were combined with one or more crosslinkers as shown in Table 7. The various compositions of coating solutions were allowed to sit in an airtight container. The solutions were then applied as a wet film to (S1) or (S2) in the same manner as described for Example Set 1. The coated films were dried in an oven at 100-120° C. for 10 minutes.

Subsequently the films were subjected to UV (H-bulb) irradiation by 3 passes at the speed of 35 feet per minute. Alternatively, the films were subjected to UV irradiation from a 254-nanometer (nm) bulb using a similar approach. The resulting films were carefully removed from the coating substrates and cut into smaller pieces and placed into vials containing MEK solvent. The vials were visually observed to determine whether the film was soluble or insoluble in the MEK solvent. Solutions classified as "insoluble" indicated that the fluoropolymer was crosslinked, while solutions classified as "soluble" indicate that the solutions did not crosslink.

The data listed in Table 7 verified that the fluoropolymers reacted with either the listed crosslinkers or grafting agents, as confirmed by the visual observation of insolubility of the liquid in the vials.

TABLE 7

Photocrosslinking of functional fluoropolymers aided by multi-functional acrylates/functionalized particles and photo-initiators

| Fluoropolymer | Photo-initiator | Crosslinker | UV | Observations |
|---|---|---|---|---|
| FT 2430 | 1173 | — | H-Bulb | Soluble |
| FT 2430 | 1173 | TMPTA (20%) | H-Bulb | Slightly insoluble |
| E15742 | KB-1 | — | 254 nm | Slightly insoluble |
| E15742 | KB-1 | — | H-bulb | Slightly insoluble |
| E15742 | 1173 | — | H-bulb | Insoluble |
| E15742 | 1173 | — | 254 nm | Slightly insoluble |
| E15742 | KB-1 | PETA | 254 nm | Insoluble/cloudy |
| E15742 | 1173 | PETA | 254 nm | Insoluble/cloudy |
| E15742 | KB-1 | TMPTA | 254 nm | Insoluble |
| E15742 | 1173 | TMPTA | 254 nm | Insoluble |
| E15742 | KB-1 | TMPTA/MMA | H-bulb | Insoluble |
| E15742 | 1173 | TMPTA/MMA | H-bulb | Insoluble |
| E15742 | KB-1 | F—$SiO_2$ (vinyl/HMDS) | 254 nm | Insoluble |
| E15742 | 1173 | F—$SiO_2$ (vinyl/HMDS) | 254 nm | Insoluble |
| E15742 | 1173 | F—$SiO_2$ (A174/HMDS) | 254 nm | Insoluble |
| E15742 | KB-1 | PETA | H-bulb | Insoluble |
| E15742 | 1173 | PETA | H-bulb | Insoluble |
| E15742 | KB-1 | F—$SiO_2$ (vinyl/HMDS) | H-bulb | Insoluble |
| E15742 | 1173 | F—$SiO_2$ (vinyl/HMDS) | H-bulb | Insoluble |
| E15742 | 1173 | Divinyl benzene | H-bulb | insoluble |
| E15742 | 1173 | F—$SiO_2$ (A174/HMDS) | H-bulb | Insoluble |

These data show the utility of the combination of functional fluoropolymer and crosslinker or functional silica particles to form a more highly crosslinked polymer systems.

Example Set 3

Scratch Resistance Improved by Adhesion Promoters, Multi-Functional Crosslinkers In a similar manner low index coating solutions of the invention were prepared as described in Table 8. The fluoropolymers solutions were further combined with TMPTA, MMA, aminosilane and a photo-initiator in the various ratios shown in Table 8. The coating solutions were allowed to sit in an airtight container and were then applied as a wet coating in the manner described in Example Set 1 to (S1) or (S2). The coated films were dried in an oven at 100-120° C. for 10 minutes.

Subsequently the films were subjected to UV (H-bulb) irradiation by 3 passes at the speed of 35 feet per minute. Alternatively, the films were subjected to UV irradiation from a 254-nm bulb using a similar approach. Rubbing with a paper towel tested the scratch resistance of the films, which is an indicator of good interfacial adhesion between the film and the substrate.

As shown in Table 8, the resulting films showed excellent interfacial adhesion, especially in samples utilizing the aminosilane or A1106 adhesion promoter to (S1) or (S2). Further, irradiation of the various samples resulted in improved interfacial adhesion, as observed in comparing the layers subjected to UV exposure in Table 8 with similar layers not subjected to UV exposure in Table 9.

TABLE 8

Improvement of scratch resistance of fluoropolymer films by adhesion promoters, photocrosslinkers agents

| Fluoropolymer/Adhesion Promoter (95:5; W %) | Crosslinker/Monomer | Photo-Initiator (1 w %) | Light Source | Observations |
|---|---|---|---|---|
| THV220 | | | H-bulb | Film peeling off |
| THV220/A1106 | | | H-bulb | Some scratching |
| THV220/A1106 (80) | TMPTA (5)/MMA(15) | 1173 | H-bulb | No scratching |
| THV220/A1106 (90) | TMPTA (5)/MMA(5) | 1173 | H-bulb | Slight scratching |
| THV220/A1106 (80) | TMPTA (10)/MMA(10) | 1173 | H-bulb | Slight scratch |
| E15742 | | 1173 | H-bulb | Film peeling off |
| E15742/A1106 | | 1173 | H-bulb | Some scratching |
| E15742/A1106 (90) | TMPTA (10) | 1173 | H-bulb | No scratching |
| E15742/A1106 (98) | TMPTA (2) | KB-1 | H-bulb | No scratching |
| E15742/A1106 (95) | TMPTA (5) | KB-1 | H-bulb | No scratching |
| E15742/A1106 (85) | TMPTA (5)/MMA(15) | 1173 | H-bulb | No scratching |
| E15742/A1106 (90) | TMPTA (2.5)/MMA(7.5) | 1173 | H-bulb | No scratching |
| E15742/A1106 (96) | TMPTA (2) HFPO-1 (2) | KB-1 | H-bulb | No scratching |
| E15742/A1106 (96) | TMPTA (2) HFPO-3 (2) | KB-1 | H-bulb | No scratching |
| E15742/A1106 (90) | TMPTA (5) HFPO-3 (5) | KB-1 | H-bulb | No scratching |
| E15742/A1106 (95) | HFPO-3 (5) | KB-1 | H-bulb | No scratching |

TABLE 9

Comparative examples fluoropolymer films without UV treatment

| Fluoropolymer/Adhesion Promoter (95:5; W %) | Crosslinker/Grafting agent/monomer | Photo-Initiator (1 w %) | UV (35 feet/Min 3 passes) | Observations |
|---|---|---|---|---|
| THV220 | | | No | Film peeling off |
| THV220/A1106 | | | No | Scratching |
| THV220/A1106 (80) | TMPTA (5)/MMA(15) | 1173 | No | Scratching |
| THV220/A1106 (90) | TMPTA (5)/MMA(5) | 1173 | No | Scratching |
| THV220/A1106 (80) | TMPTA (10)/MMA(10) | 1173 | No | Scratching |
| E15742/A1106 | | | No | Scratching |
| E15742/A1106 (90) | TMPTA (10) | 1173 | No | Scratching |
| E15742/A1106 (98) | TMPTA (2) | KB-1 | No | Scratching |
| E15742/A1106 (95) | TMPTA (5) | KB-1 | No | Scratching |
| E15742/A1106 (85) | TMPTA (5)/MMA(15) | 1173 | No | Scratching |
| E15742/A1106 (90) | TMPTA (2.5)/MMA(7.5) | 1173 | No | Scratching |

Example Set 4

Refractive Index Measurements

For samples in Table 8 that showed improved scratch resistance as compared with similar samples in Table 9, refractive index measurements were performed to confirm the resultant coatings usefulness as a low refractive index layer, wherein the measure refractive index is below 1.4. As Table 10 indicates, each of the scratch resistant samples had refractive indexes less than 1.4.

TABLE 10

Refractive indices of such fluoropolymer films with improved scratch resistance

| Fluoropolymer/ Adhesion Promoter (95:5; W %) | Crosslinker/ Grafting Agent/ Monomer | Photo- Initiator (1 w %) | Wavelength (nm) | Refrac- tive Index | K |
|---|---|---|---|---|---|
| E15742/A1106 (96) | TMPTA(2)/ HFPO-1(2) | KB-1 | 533.567 | 1.3806 | 0.00548 |
| E15742/A1106 (95) | Vinylsilane (5) | 1173 | 533.567 | 1.3457 | 0.01844 |
| E15742/A1106 (80) | A174(15)/ TMPTA(5) | 1173 | 533.567 | 1.3556 | 0.02109 |
| E15742/A1106 (95) | A174(5) | 1173 | 533.567 | 1.3740 | 0.00856 |
| E15742/A1106 (90) | Vinylsilane (10) | 1173 | 533.567 | 1.3777 | 0.0094 |

Description of the Coating Process Used for the Coating Compositions of the Invention on Substrate (S3) and (S4)

The low index coating solutions described in the following tables were coated onto the PET substrates (S3) and (S4) using a precision, metered die coater. For this step, a syringe pump was used to meter the solution into the die. The solutions were diluted to a concentration of 3% to 5% solids as indicated in Table 11 and coated onto S3 or S4 to achieve a dry thickness of 100 nm. The material was dried in a conventional air flotation oven and then sent through the UV chamber having less than 50 ppm oxygen. The UV chamber was equipped with a 600 watt H-type bulb from Fusion UV systems, Gaithersburg Md., operating at full power. The coating and drying parameters for the low index coating solutions are shown as follows in Table 11.

TABLE 11

Coating and curing conditions used for coating low index compositions on (S2), (S3) and (S4):

| | |
|---|---|
| Coating Width: | 4" (10 cm) |
| Web Speed: | 10 feet per minute |
| Solution % Solids: | 5.0% |
| Pump: | 60 cc Syringe Pump |
| Approximate Flow Rate: | 1.2 cc/min |
| Approximate Wet Coating Thickness: | 6 microns |
| Approximate Dry Coating Thickness: | 100 nm |
| Conventional Oven Temps: | 120° C. Zone 1 |
| | 120° C. Zone 2 |
| Length of Oven: | 10 feet (3 m) |

Example Set 5

Preparation of Antireflective Coatings of the Invention on Substrates (S2), (S3) and (S4)

The coated films of Tables 12A and 12B were prepared according to the coating method of Table 11. The low refractive index compositions are listed by weight percent of the components added to the solution. The coating solutions contained an additional 1-weight percent of KB1 or Darocure 1173 photoinitiator based on solids. The preparation of the particles was described above and the type and ratio of surface modification is noted in Table 12A. All reagents were added to the coating solution, except for the A1106, and were diluted to about 5 weight percent solids with a 50/50 weight percent solution of MEK-MIBK. The A1106 was added to the coating solution no more than 4 hours prior to coating it onto the substrate. The low index coating solutions were coated and cured according to the method of Table 11. The results are summarized in Tables 12A and 12B:

TABLE 12A

Durability of Anti-reflective films constructed from a high index layer and a fluoropolymer/silica particle composite low index layer of the invention mentioned

| Exam- ples | Substrate | E 15742 | THV 200 | TMPTA | A 1106 | Si-Particles |
|---|---|---|---|---|---|---|
| C1 (*) | S2 | 100 | | | 0 | |
| C2(*) | S2 | | 100 | | 0 | |
| C3 (*) | S2 | | 75 | 25 | 0 | |
| C4 (*) | S2 | | 50 | 50 | 0 | |
| EX1 | S2 | 55 | | 15 | 5 | 25% 20 nm Si Particle. 50% A174 modified/HMDS post treat |
| EX2 | S2 | 70 | | 10 | 5 | 15% Fumed Si, (380 m2/g area), A174 treated |
| EX3 | S2 | 75 | | 10 | 5 | 10% 20 nm Si Particle. 100% A174 modified/HMDS post treat |
| EX4 | S2 | 75 | | 10 | 5 | 10% 20 nm Si Particle. 100% Vinyl silane modified/HMDS post treat |
| EX5 | S2 | 70 | | 15 | 5 | 10% 20 nm Si particle 50% A174 modified/HMDS post treated |
| EX6 | S2 | 60 | | 15 | 5 | 20% 20 nm Si particle 50% A174 modified/HMDS post treated |
| EX7 | S2 | 50 | | 15 | 5 | 30% 20 nm Si particle 50% A174 modified/HMDS post treated |
| EX8 | S2 | 40 | | 15 | 5 | 40% 20 nm Si particle 50% A174 modified/HMDS post treated |
| EX9 | S3 | 70 | | 15 | 5 | 10% 20 nm Si particle 50% A174 modified/HMDS post treated |
| EX10 | S3 | 50 | | 15 | 5 | 10% 20 nm Si particle 50% A174 modified/HMDS post treated |

TABLE 12A-continued

Durability of Anti-reflective films constructed from a high index layer and a fluoropolymer/silica particle composite low index layer of the invention mentioned

| Examples | Substrate | E 15742 | THV 200 | TMPTA | A 1106 | Si-Particles |
|---|---|---|---|---|---|---|
| EX11 | S4 | 50 | | 15 | 5 | 30% Si Particles 25% A 174 modifications |
| EX12 | S4 | 50 | | 15 | 5 | 30% Si particles w/ 75% A 174 modifications |

TABLE 12B

| Examples | Cheese Cloth (wipes to failure/weight) | Linear Scratch | Sand Testing |
|---|---|---|---|
| C1 (*) | <25 wipes 300 g | FD-50 g | 100% |
| C2(*) | <25 wipes 300 g | FD-50 g | 100% |
| C3(*) | | SS/PD 250 g | 70% |
| C4 (*) | | SS-250 g SS/PD 350 g | 29% |
| EX1 | 850/900 300 g | SS/PD 100 g | 25% |
| EX2 | 50/100 300 g; slight wipe off | | |
| EX3 | 50/100-300 g | | |
| EX4 | <25 wiped off completely 300 g | | |
| EX5 | NS, >1000, 300 g; NS, >1000, 725 g; NS >1000 2 kg | NS 350 g and SS 600 g, 5 mm tip | |
| EX6 | 100/150 300 g; 25/50, 725 g | SS 400 g, 5 mm tip | |
| EX7 | 800/850 300 g; 700/750 725 g; 250/300 2 Kg | SS-200 g | |
| EX8 | >1000 300 g; 150/200 725 g; 25/50 2 kg | FD 100 g | |
| EX9 | 150-scratch 300 g; 100-slight scratch 725 g; 25-scratch, 2 kg | SS-50 g | ~100 |
| EX10 | 300-slight scratch 300 g; 200-scratch, | SS-100 g | 18 |
| EX11 | 725 g; 25-slight scratch, 2 kg 200-scratches, 300 g; 200-coating wiped off 725 g; | SS/PD-50 g | 95% |
| EX12 | 250 scratches, 300 g; 200 Coating wiped off 725 g; 100 scratches 2 kg | SS/PD 250 g | 18% |

As Table 12B indicates, the use of adhesion promoter, silica particles and organosilane exhibited improved durability performance over those low index coating solution which did not utilize these reagents. These low refractive index compositions demonstrated adequate mechanical durability, even using the harshest cheesecloth test (2 kilogram weight with 1.25" pin).

Example Set 6

In the peel test, a peeling device was dragged across the coated surface in an attempt to remove the low index refractive layer from the underlying substrate. Results below show the amount of force (in pounds per inch) necessary to rip the coating layer. The higher the number, the greater the interfacial adhesion. A ripped sample is one in which the substrate gave away at the force shown in Tables 13A and 13B, and does not indicate a failed test.

In Tables 13A and 13B, interfacial adhesion between high index layers (S1) or (S3) and low index layers were evaluated. For this table, low refractive index coatings were formed in varying amounts using THV 200 fluoroplastic or FC 2145 fluoroelastomer modified with varying amounts of tetraethoxy silane ("TEOS") as the fluoropolymer, surface modified silicon dioxide nanoparticles, and either A-1106 or 3-aminopropyltriethoxysilane ("3-APS") as the amino substituted silane ester or ester equivalent.

TABLE 13A

Interfacial adhesion between high index layers and low index layers of fluoropolymer/silica generated from TEOS by aminosilane esters

| Example | Substrate | THV200/ TEOS (90/10) | THV200/ TEOS (70/30) | FC2145/ TEOS (90/10) | FC2145/ TEOS (70/30) | A1106 | 3-APS |
|---|---|---|---|---|---|---|---|
| A | S4 | 95 | | | | 5 | |
| B | S4 | 95 | | | | | 5 |
| C | S4 | | 95 | | | 5 | |
| D | S4 | | 95 | | | | 5 |
| E | S4 | | | 95 | | 5 | |
| F | S4 | | | 95 | | | 5 |
| G | S4 | | | | 95 | 5 | |
| H | S4 | | | | 95 | | 5 |
| I | S1 | 95 | | | | | 5 |
| J | S1 | | 95 | | | 5 | |
| K | S1 | | 95 | | | | 5 |
| L | S1 | | | 95 | | 5 | |
| M | S1 | | | 95 | | | 5 |

TABLE 13B

| Example | Peel test (lbs/in) | Boiling water Test (2 hours) |
| --- | --- | --- |
| A | 3.8 ripped | Not delaminated |
| B | 3.4 ripped | Not delaminated |
| C | 4.3 ripped | Not delaminated |
| D | 5.3 ripped | Not delaminated |
| E | 4.5 | Not delaminated |
| F | 2.8 | Not delaminated |
| G | 5.1 ripped | Not delaminated |
| H | 2.6 | Not delaminated |
| I | 5.2 ripped | Not delaminated |
| J | 4.8 ripped | Not delaminated |
| K | 2.7 | Not delaminated |
| L | 4.2 ripped | Not delaminated |
| M | 3.5 | Not delaminated |

As Table 13B indicates, all of the samples passed the boiling water test and each sample showed adequate peel test adherence, thus confirming that adequate interfacial adhesion between the high refractive layer and low refractive index layer in the presence of TEOS type reagents.

The results as shown in the examples provided indicate the viability of the low refractive index coating compositions of the present invention. The coatings may be applied as the low refractive index coating layer of an antireflection film and are suitable for use on optical devices requiring surfaces having improved optical transmissivity, decreased glare, durability, and, in some cases, ink and stain repellency.

While the invention has been described in terms of preferred embodiments, it will be understood, of course, that the invention is not limited thereto since modifications may be made by those skilled in the art, particularly in light of the foregoing teachings.

What is claimed is:

1. A coatable low refractive index composition for use in an antireflection coating of an optical display component, the composition comprising the reaction product of:
    a reactive fluoropolymer;
    at least one amino organosilane ester coupling agent or its ester equivalent; and
    a multi-olefinic crosslinker.

2. The composition of claim 1, wherein said multi-olefinic crosslinker comprises a multi-acrylate crosslinker.

3. The composition of claim 1 wherein said reactive fluoropolymer comprises a crystalline reactive fluoropolymer.

4. The composition of claim 1, wherein said reactive fluoropolymer comprises an amorphous reactive fluoropolymer.

5. The composition of claim 4, wherein said amorphous reactive fluoropolymer is selected from the group consisting of a Cl-containing fluoroelastomer, a Br-containing fluoroelastomer, an I-containing fluoroelastomer, a nitrile-containing fluoroelastomer, a carbonyl-containing fluoroelastomer, an ester-containing fluoroelastomer and a C=C containing fluoroelastomer.

6. The composition of claim 1, wherein said one amino organosilane ester coupling agent or its ester equivalent is selected from the group consisting of 3-aminopropyltrimethoxysilane, 3-aminopropyltriethoxysilane, (aminoethylaminomethyl)phenethyltrimethoxysilane, (aminoethylaminomethyl)phenethyltrimethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 4-aminobutyltrimethoxysilane, 4-aminobutyltriethoxysilane, 3-aminopropylmethyldiethoxysilane, 3-aminopropylmethyldimethoxysilane, 3-aminopropyldimethylmethoxysilane, 3-aminopropyldimethylethoxysilane, 2,2-dimethoxy-1-aza-2-silacyclopentane-1-ethanamine, 2,2-diethoxy-1-aza-2-silacyclopentane-1-ethanamine, 2,2-diethoxy-1-aza-2-silacyclopentane, 2,2-dimethoxy-1-aza-2-silacyclopentane, 4-aminophenyltrimethoxy silane, and 3-phenylaminopropyltrimethoxy silane.

7. The composition of claim 2, wherein said multi-acrylate crosslinker comprises a fluorinated multi-acrylate crosslinker.

8. The composition of claim 7, wherein said fluorinated multi-acrylate crosslinker comprises a perfluoropolyether multi-acrylate crosslinker.

9. The composition of claim 8, wherein said perfluoropolyether multi-acrylate crosslinker comprises an HFPO-multiacrylate crosslinker.

10. The composition of claim 2, wherein said multi-acrylate crosslinker is selected from the group consisting of PETA and TMPTA.

11. The composition of claim 2, further comprising a monoacrylate.

12. The composition of claim 11, wherein said monoacrylate comprises a fluorinated monoacrylate.

13. The composition of claim 12, wherein said fluorinated monoacrylate comprises a perfluoropolyether monoacrylate.

14. The composition of claim 13, wherein said perfluoropolyether monoacrylate comprises an HFPO-monoacrylate.

15. The composition of claim 1 further comprising a plurality of surface modified inorganic nanoparticles.

16. The composition of claim 15, where in the surface modified particles comprises a mixture of reactive functionality such as acryl, methacryl and/or vinyl groups and non-reactive groups such as trimethylsilyl, and high alkyl and fluoroalkyl silyl groups.

17. The composition of claim 1, wherein said composition further comprises a sol gel precursor selected from the group consisting of a tetraalkoxysilane, a trialkoxysilane, and mixtures thereof.

18. The composition of claim 17, wherein said tetraalkoxysilane is selected from the group consisting of tetraethoxysilane and vinyl triethoxysilane.

19. An antireflection film having a layer of said low refractive index material of claim 1, said antireflection film further comprising a high refractive index layer coupled to said layer of said low refractive index material.

20. An antireflection film having a layer of said low refractive index composition of claim 1, said antireflection film further comprising a zirconium-containing high refractive index layer coupled to said layer of said low refractive index composition.

21. An optical device comprising a layer of said low refractive index composition formed according to claim 1.

22. A method for forming an optically transmissive, stain and ink repellent, durable optical display for use on an article, the method comprising:
    providing an optical display having an optical substrate;
    forming a low refractive index polymer composition comprising the reaction product of a reactive fluoropolymer, an amino silane ester coupling agent or ester equivalent, and a multi-olefinic crosslinker;
    applying a layer of said low refractive index polymer composition to said optical substrate; and
    curing said layer to form a cured film.

23. The method of claim 22, wherein providing an optical display comprises providing an optical display having a hard coat layer applied to an optical substrate.

24. The method of claim 22, wherein forming a low refractive index polymer composition comprises:
- reactively coupling a fluoropolymer and at least one amino organosilane ester coupling agent or its ester equivalent to form an aminosilane modified fluoropolymer; and
- introducing a multi-olefinic crosslinker to said aminosilane modified fluoropolymer.

25. A coatable low refractive index composition for use in an antireflection coating of an optical display component, the composition comprising the reaction product of:
- a fluoropolymer;
- at least one amino organosilane ester coupling agent or its ester equivalent;
- a multi-olefinic crosslinker; and
- a plurality of surface modified nanoparticles.

26. An antireflection film having a layer of said low refractive index composition of claim 25, said antireflection film further comprising a zirconium-containing high refractive index layer coupled to said layer of said low refractive index composition.

27. A coatable low refractive index composition for use in an antireflection coating of an optical display component, the composition comprising the reaction product of:
- a fluoropolymer;
- at least one amino organosilane ester coupling agent or its ester equivalent;
- a multi-olefinic crosslinker; and
- a sol gel precursor selected from the group consisting of a tetraalkoxysilane, a trialkoxysilane, and mixtures thereof.

28. An antireflection film having a layer of said low refractive index composition of claim 27, said antireflection film further comprising a zirconium-containing high refractive index layer coupled to said layer of said low refractive index composition.

* * * * *

UNITED STATES PATENT AND TRADEMARK OFFICE
CERTIFICATE OF CORRECTION

PATENT NO.       : 7,323,514 B2
APPLICATION NO.  : 11/026640
DATED            : January 29, 2008
INVENTOR(S)      : Naiyong Jing It is certified that error appears in the above-identified patent and that said Letters Patent is hereby corrected as shown below:

Column 3
Line 48, Delete "("CRTs")+signage," and insert -- ("CRTs"), signage, --, therefor.

Column 4
Line 51, Delete "("TEOS')" and insert -- ("TEOS") --, therefor.

Column 5
Line 39, Delete "0471" and insert -- 0-471 --, therefor.

Column 6
Line 7, Delete "—($CH_2$—$CF_3$)$_Z$—" and insert -- —($CH_2$—$CF_2$)$_Z$— --, therefor.
Line 59, Delete "fluorelastomeric" and insert -- fluoroelastomeric --, therefor.

Column 8
Line 13, Delete "perfluoroinated" and insert -- perfluorinated --, therefor.
Line 18, Delete "photochemcially" and insert -- photochemically --, therefor.

Column 10
Line 24, Delete "[RO)$_3$" and insert -- [(RO)$_3$ --, therefor.
Line 58-59, After "diacrylate," delete "caprolactone modified neopentylglycol hydroxypivalate diacrylate, --, therefor.

Column 11
Line 57, Delete "olephobicity" and insert -- oleophobicity --, therefor.
Line 61, Delete "end group" and insert -- endgroup --, therefor.

Column 12
Line 26, Delete "fluoroinated" and insert -- fluorinated --, therefor.
Line 36, Delete "hexamethydisilizane" and insert -- hexamethyldisilizane --, therefor.

Column 15
Line 30, Delete "terepthalate" and insert -- terephthalate --, therefor.

Column 16
Line 65, Delete "Imager," and insert -- Imager[TM], --, therefor.

Column 17
Line 62, Delete "tri acrylate" and insert -- triacrylate --, therefor.

UNITED STATES PATENT AND TRADEMARK OFFICE
CERTIFICATE OF CORRECTION

PATENT NO. : 7,323,514 B2
APPLICATION NO. : 11/026640
DATED : January 29, 2008
INVENTOR(S) : Naiyong Jing It is certified that error appears in the above-identified patent and that said Letters Patent is hereby corrected as shown below:

Column 19
Line 7, Delete "55 C." and insert -- 55° C. --, therefor.
Line 66-67, Delete "A-174HMDS" and insert -- A-174/HMDS --, therefor.

Column 28
Line 33, Delete "m2/g" and insert -- $m^2/g$ --, therefor.

Column 32
Line 2-3, In Claim 6, delete "3  -aminopropylmethyldiethoxysilane," and insert -- 3-aminopropylmethyldiethoxysilane, --, therefor.

Signed and Sealed this

Third Day of June, 2008

JON W. DUDAS
*Director of the United States Patent and Trademark Office*